United States Patent
Demmelmaier-Chang et al.

(10) Patent No.: US 12,286,595 B2
(45) Date of Patent: Apr. 29, 2025

(54) USE OF HIGH HALIDE-CONTAINING CATALYST IN FRONT REACTORS TO EXTEND THE LIFE AND SELECTIVITY OF REFORMING CATALYST

(71) Applicant: Chevron Phillips Chemical Company LP, The Woodlands, TX (US)

(72) Inventors: Cori A. Demmelmaier-Chang, Houston, TX (US); Joseph Bergmeister, III, Spring, TX (US); Vincent D. McGahee, Kemah, TX (US); Gabriela D. Alvez-Manoli, Kingwood, TX (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 163 days.

(21) Appl. No.: 18/322,132

(22) Filed: May 23, 2023

(65) Prior Publication Data
US 2023/0407189 A1 Dec. 21, 2023

Related U.S. Application Data

(60) Provisional application No. 63/353,372, filed on Jun. 17, 2022.

(51) Int. Cl.
*C10G 35/095* (2006.01)

(52) U.S. Cl.
CPC ....... *C10G 35/095* (2013.01); *C10G 2300/70* (2013.01); *C10G 2400/30* (2013.01)

(58) Field of Classification Search
CPC .............. C01G 35/095; C01G 2300/70; C01G 2400/30; C01G 35/06; C01G 59/02; B01J 29/62; B01J 37/26; B01J 2229/20
See application file for complete search history.

(56) References Cited

U.S. PATENT DOCUMENTS

| | | |
|---|---|---|
| 2,882,244 A | 4/1959 | Milton |
| 3,130,007 A | 4/1964 | Breck |
| 3,216,789 A | 11/1965 | Breck |
| 4,021,447 A | 5/1977 | Rubin |
| 4,104,320 A | 8/1978 | Bernard |

(Continued)

FOREIGN PATENT DOCUMENTS

| | | |
|---|---|---|
| EP | 498182 A | 8/1992 |

OTHER PUBLICATIONS

International Search Report and Written Opinion issued in corresponding PCT Application No. PCT/US2023/023265, mailed on Aug. 18, 2023, 13 pp.

(Continued)

*Primary Examiner* — Ali Z Fadhel
(74) *Attorney, Agent, or Firm* — Eversheds Sutherland (US) LLP

(57) ABSTRACT

This disclosure provides processes for reforming hydrocarbons by using a series of adiabatic reactors and catalysts, in which the catalyst(s) in at least one front or upstream catalyst bed or reactor includes a higher fluoride concentration, higher chloride concentration, or both than the respective halide concentrations in the catalysts in one or more downstream catalyst beds or reactors, which has been unexpectedly discovered to extend the useful life and/or the selectivity of the catalyst system.

28 Claims, 3 Drawing Sheets

(56) References Cited

U.S. PATENT DOCUMENTS

| | | | |
|---|---|---|---|
| 4,174,270 A * | 11/1979 | Mayes | C10G 59/02 |
| | | | 208/65 |
| 4,456,527 A | 6/1984 | Buss | |
| 4,503,023 A | 3/1985 | Breck | |
| 4,517,306 A | 5/1985 | Buss | |
| 4,544,539 A | 10/1985 | Wortel | |
| 4,987,109 A | 1/1991 | Kao | |
| 5,059,304 A | 10/1991 | Field | |
| 5,259,946 A | 11/1993 | Robinson | |
| 5,292,427 A * | 3/1994 | McVicker | C10G 59/02 |
| | | | 208/65 |
| 5,354,933 A | 10/1994 | Ohashi | |
| 5,401,386 A | 3/1995 | Morrison | |
| 5,518,607 A | 5/1996 | Field | |
| 5,877,367 A | 3/1999 | Witte | |
| 6,004,452 A | 12/1999 | Ash | |
| 6,190,539 B1 | 2/2001 | Holtermann | |
| 6,548,030 B2 | 4/2003 | Heyse | |
| 6,812,180 B2 | 11/2004 | Fukunaga | |
| 6,900,365 B2 | 5/2005 | Chen | |
| 7,153,801 B2 | 12/2006 | Wu | |
| 7,902,105 B2 | 3/2011 | Khare | |
| 7,932,425 B2 | 4/2011 | Blessing | |
| 8,912,108 B2 | 12/2014 | Wu | |
| 9,421,530 B2 | 8/2016 | Wu | |
| 9,718,042 B2 | 8/2017 | Demmelmaier | |
| 2008/0027255 A1 | 1/2008 | Blessing | |
| 2018/0065115 A1 | 3/2018 | Alvez-Manoli | |
| 2019/0315666 A1 | 10/2019 | Weber | |

OTHER PUBLICATIONS

Belopukhov Evgeny A. et al, "Investigation of fluorine-promoted Pt-Re/Al2O3 catalysts in reforming of n-heptane 11," Catalysis Today, vol. 378, Oct. 1, 2021 (Oct. 1, 2021), pp. 113-118, XP093071795, Amsterdam, NL ISSN: 0920-5861, DOI: 10.1016/j.cattod.2021.06.016, Retrieved from the Internet: URL:https://www.sciencedirect.com/science/article/pii/S0920586121002832/pdfft?md5=340817eaff3b42cca8c008e85b3ef2aa&pid=1-s2.0-S0920586121002832-main.pdf.

Tetsuya Fukunaga et al, "Halogen-promoted Pt/KL Zeolite Catalyst for the Production of Aromatic Hydrocarbons from Light Naphtha," Catalysis Surveys From Asia, Kluwer Academic Publishers, DO, vol. 14, No. 3-4, Jun. 4, 2010 (Jun. 4, 2010) pp. 96-102, XF019815271, ISSN: 1574-9266.

* cited by examiner

USE OF HIGH HALIDE-CONTAINING CATALYST IN FRONT REACTORS TO EXTEND THE LIFE AND SELECTIVITY OF REFORMING CATALYST

CROSS REFERENCE TO RELATED APPLICATIONS

This applications claims the benefit of and priority to U.S. Provisional Application No. 63/353,372, filed Jun. 17, 2022, which is incorporated by reference in its entirety.

TECHNICAL FIELD OF THE INVENTION

This disclosure relates to supported aromatization catalysts and their use in aromatizing aliphatic hydrocarbons to aromatic hydrocarbons.

BACKGROUND

The catalytic conversion of aliphatic hydrocarbons into aromatic compounds, often referred to as aromatization or reforming, is an important industrial process for the production of benzene, toluene, and xylenes from a naphtha feed. These aromatic hydrocarbons are valued as precursors to polymer products, as solvents, and as fuel or fuel additives due to their high-octane number.

Traditional aromatization reactor systems include a series of adiabatic reactors in which the only heat entering the reactor is carried by the input streams. The aromatization catalyst in the reactor system is typically a supported transition metal catalyst that effects multiple reactions, including dehydrogenation, isomerization, and cyclization of aliphatic hydrocarbons to produce specific aromatic compounds. However, aromatization catalysts may lose their activity and/or selectivity over time, which can dramatically affect the economics of the process. Given their commercial importance, an ongoing need exists for improved systems, catalysts, and processes that may enhance the production of aromatic hydrocarbons.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

The aromatization or reforming catalysts according to this disclosure can comprise an inorganic support, a Group 8-10 metal, and fluoride and/or chloride. In an aspect, this disclosure provides processes for reforming hydrocarbons by using a series of adiabatic reactors and catalysts, in which the catalyst(s) in at least one front or upstream catalyst bed or reactor can include a higher fluoride content (concentration), a higher chloride content, or both a higher fluoride and a higher chloride content than the catalysts in one or more downstream catalyst beds or reactors. It has been unexpectedly discovered that by using a higher weight percent of halide in at least one front or upstream catalyst bed or reactor as compared to one or more downstream catalyst beds or reactors, the useful life and/or the selectivity of the catalyst system may be extended.

While not intending to be bound by theory, it has been discovered that the fluoride and chloride concentration of the aromatization catalyst can decrease over time, and this fluoride and chloride loss appears to be associated with a reduction in catalyst selectivity. This decline in selectivity can become sufficiently severe that it becomes more economically feasible to turn around the commercial plant and replace the catalyst with fresh catalyst, despite the catalyst being well within the temperature limits of the process equipment and retaining significant catalyst activity. Applicant has discovered that a higher weight percent of fluoride, chloride, or both fluoride and chloride in at least one upstream reactor in series as compared a downstream reactor, can sustain the selectivity of the catalyst system for substantially longer times.

In an aspect, this disclosure provides a process for reforming hydrocarbons, the process comprising:
  a) in a first catalyst bed, contacting a feedstock containing aliphatic hydrocarbons with a first catalyst comprising an inorganic support, a Group 8-10 metal, and at least or about 1.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons;
  b) in one or more intermediate catalyst beds in series, contacting the first catalyst bed discharge with the one or more independently selected intermediate catalysts, each comprising an inorganic support, a Group 8-10 metal, and fluoride, under conditions for aromatizing aliphatic hydrocarbons to form one or more intermediate catalyst bed discharges comprising aromatic hydrocarbons and aliphatic hydrocarbons; and
  c) in a last catalyst bed, contacting the one or more intermediate catalyst bed discharges with a last catalyst comprising an inorganic support, a Group 8-10 metal, and at least or about 0.7 wt % fluoride relative to the weight of the last catalyst prior to reduction, under conditions for aromatizing aliphatic hydrocarbons to form a last catalyst bed discharge comprising aromatic products;
  wherein the fluoride concentration of the first catalyst or the fluoride concentration of at least one of the intermediate catalysts is greater than the fluoride concentration of the last catalyst prior to reduction.

In another aspect, this disclosure provides a process for reforming hydrocarbons, the process comprising:
  a) in a first catalyst bed, contacting a feedstock containing aliphatic hydrocarbons with a first catalyst comprising an inorganic support, a Group 8-10 metal, and at least or about 1.5 wt % chloride relative to the weight of the first catalyst prior to reduction, under conditions for aromatizing aliphatic hydrocarbons to form a first catalyst bed discharge comprising aromatic hydrocarbons and aliphatic hydrocarbons;
  b) in one or more intermediate catalyst beds in series, contacting the first catalyst bed discharge with the one or more independently selected intermediate catalysts, each comprising an inorganic support, a Group 8-10 metal, and chloride, under conditions for aromatizing aliphatic hydrocarbons to form one or more intermediate catalyst bed discharges comprising aromatic hydrocarbons and aliphatic hydrocarbons; and
  c) in a last catalyst bed, contacting the one or more intermediate catalyst bed discharges with a last catalyst comprising an inorganic support, a Group 8-10 metal, and at least or about 0.5 wt % chloride relative to the weight of the last catalyst prior to reduction, under conditions for aromatizing aliphatic hydrocarbons to form a last catalyst bed discharge comprising aromatic products;

wherein the chloride concentration of the first catalyst or the chloride concentration of at least one of the intermediate catalysts is greater than the chloride concentration of the last catalyst prior to reduction.

Generally and unless specified otherwise, the weight percentages of the halide, fluoride or chloride in the catalyst is specified prior to reduction of the catalyst. The use of the term "fluoride" and "chloride" is not intended to reflect any formal structure or bonding type between the fluorine atom and chlorine atom and the inorganic support, but merely reflect that a halide source is often used in the preparation of these halided catalysts.

According to a further aspect, this disclosure also provides a process for reforming hydrocarbons, the process comprising:

a) in a first catalyst bed, contacting a feedstock containing aliphatic hydrocarbons with a first catalyst comprising an inorganic support, a Group 8-10 metal, and at least or about 1.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons; and b) in a last catalyst bed, contacting the first catalyst bed discharge with a last catalyst comprising an inorganic support, a Group 8-10 metal, and at least or about 0.7 wt % fluoride relative to the weight of the last catalyst prior to reduction, under conditions for aromatizing aliphatic hydrocarbons to form a last catalyst bed discharge comprising aromatic products;

wherein the fluoride concentration of the first catalyst is greater than the fluoride concentration of the last catalyst prior to reduction.

In still a further aspect, this disclosure also provides a process for reforming hydrocarbons, the process comprising:

a) in a first catalyst bed, contacting a feedstock containing aliphatic hydrocarbons with a first catalyst comprising an inorganic support, a Group 8-10 metal, and at least or about 1.5 wt % chloride relative to the weight of the first catalyst prior to reduction, under conditions for aromatizing aliphatic hydrocarbons to form a first catalyst bed discharge comprising aromatic hydrocarbons and aliphatic hydrocarbons; and b) in a last catalyst bed, contacting the first catalyst bed discharge with a last catalyst comprising an inorganic support, a Group 8-10 metal, and at least or about 0.5 wt % chloride relative to the weight of the last catalyst prior to reduction, under conditions for aromatizing aliphatic hydrocarbons to form a last catalyst bed discharge comprising aromatic products;

wherein the chloride concentration of the first catalyst is greater than the chloride concentration of the last catalyst prior to reduction.

Therefore, in these aspects, there are two contiguous catalysts or catalyst beds in series that comprise an inorganic support, a Group 8-10 metal, and the stated fluoride or chloride concentration in a first, upstream catalyst relative to the weight of that upstream catalyst. The catalyst or catalyst bed immediately downstream comprises a comparatively lower weight percentage of fluoride or chloride relative to the weight of the downstream catalyst. Unless specified otherwise, the recited weight percentages the weight percentages in the formulated catalyst prior to reduction.

A further aspect of the present disclosure provides a catalytic hydrocarbon reforming system comprising:

at least three catalyst beds in series, including an upstream first catalyst bed, a downstream last catalyst bed, and one or more intermediate catalyst beds in series between the first catalyst bed and the last catalyst bed;

a first catalyst in the first catalyst bed comprising an inorganic support, a Group 8-10 metal, and at least or about 1.0 wt % fluoride relative to the weight of the first catalyst prior to reduction;

one or more independently selected intermediate catalysts in the one or more intermediate catalyst beds, each intermediate catalyst comprising an inorganic support, a Group 8-10 metal, and fluoride; and a last catalyst in the last catalyst bed comprising an inorganic support, a Group 8-10 metal, and at least or about 0.7 wt % fluoride relative to the weight of the last catalyst prior to reduction;

wherein the fluoride concentration of the first catalyst or the fluoride concentration of at least one of the intermediate catalysts is greater than the fluoride concentration of the last catalyst prior to reduction.

Another aspect of the present disclosure provides a catalytic hydrocarbon reforming system comprising:

at least three catalyst beds in series, including an upstream first catalyst bed, a downstream last catalyst bed, and one or more intermediate catalyst beds in series between the first catalyst bed and the last catalyst bed;

a first catalyst in the first catalyst bed comprising an inorganic support, a Group 8-10 metal, and at least or about 1.5 wt % chloride relative to the weight of the first catalyst prior to reduction;

one or more independently selected intermediate catalysts in the one or more intermediate catalyst beds, each intermediate catalyst comprising an inorganic support, a Group 8-10 metal, and chloride; and a last catalyst in the last catalyst bed comprising an inorganic support, a Group 8-10 metal, and at least or about 0.5 wt % chloride relative to the weight of the last catalyst prior to reduction;

wherein the chloride concentration of the first catalyst or the chloride concentration of at least one of the intermediate catalysts is greater than the chloride concentration of the last catalyst prior to reduction.

According to one further aspect of the present disclosure, there is provided a catalytic hydrocarbon reforming system comprising:

two catalyst beds in series, including an upstream first catalyst bed and a downstream last catalyst bed;

a first catalyst in the first catalyst bed comprising an inorganic support, a Group 8-10 metal, and at least or about 1.0 wt % fluoride relative to the weight of the first catalyst prior to reduction; and a last catalyst in the last catalyst bed comprising an inorganic support, a Group 8-10 metal, and at least or about 0.7 wt % fluoride relative to the weight of the last catalyst prior to reduction;

wherein the fluoride concentration of the first catalyst is greater than the fluoride concentration of the last catalyst prior to reduction.

According to still a further aspect of the present disclosure, there is provided a catalytic hydrocarbon reforming system comprising:

two catalyst beds in series, including an upstream first catalyst bed and a downstream last catalyst bed;

a first catalyst in the first catalyst bed comprising an inorganic support, a Group 8-10 metal, and at least or about 1.5 wt % chloride relative to the weight of the first catalyst prior to reduction; and a last catalyst in the last catalyst bed comprising an inorganic support, a Group 8-10 metal, and at least or about 0.5 wt % chloride relative to the weight of the last catalyst prior to reduction;

wherein the chloride concentration of the first catalyst is greater than the chloride concentration of the last catalyst prior to reduction.

In each of the recited processes and systems, there are practical upper limits of the concentrations of the fluoride and chloride in the catalysts. For example, in the fluoride-containing catalysts, the first catalyst can comprise up to about 5.0 wt %, up to about 4.0 wt %, up to about 3.5 wt %, up to about 3.0 wt %, or up to about 2.5 wt % fluoride relative to the weight of the first catalyst prior to reduction, and the last catalyst comprises up to about 4.0 wt %, up to about 3.0 wt %, up to about 2.5 wt %, up to about 2.0 wt %, or up to about 1.5 wt % fluoride relative to the weight of the last catalyst prior to reduction. In the chloride-containing catalysts, the first catalyst can comprise up to about 5.0 wt %, up to about 4.0 wt %, up to about 3.5 wt %, up to about 3.0 wt %, or up to about 2.5 wt % chloride relative to the weight of the first catalyst prior to reduction, and the last catalyst can comprise up to about 3.0 wt % up to about 2.5 wt %, up to about 2.0 wt %, or up to about 1.5 wt % chloride relative to the weight of the last catalyst prior to reduction.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

DEFINITIONS

Figure 1:
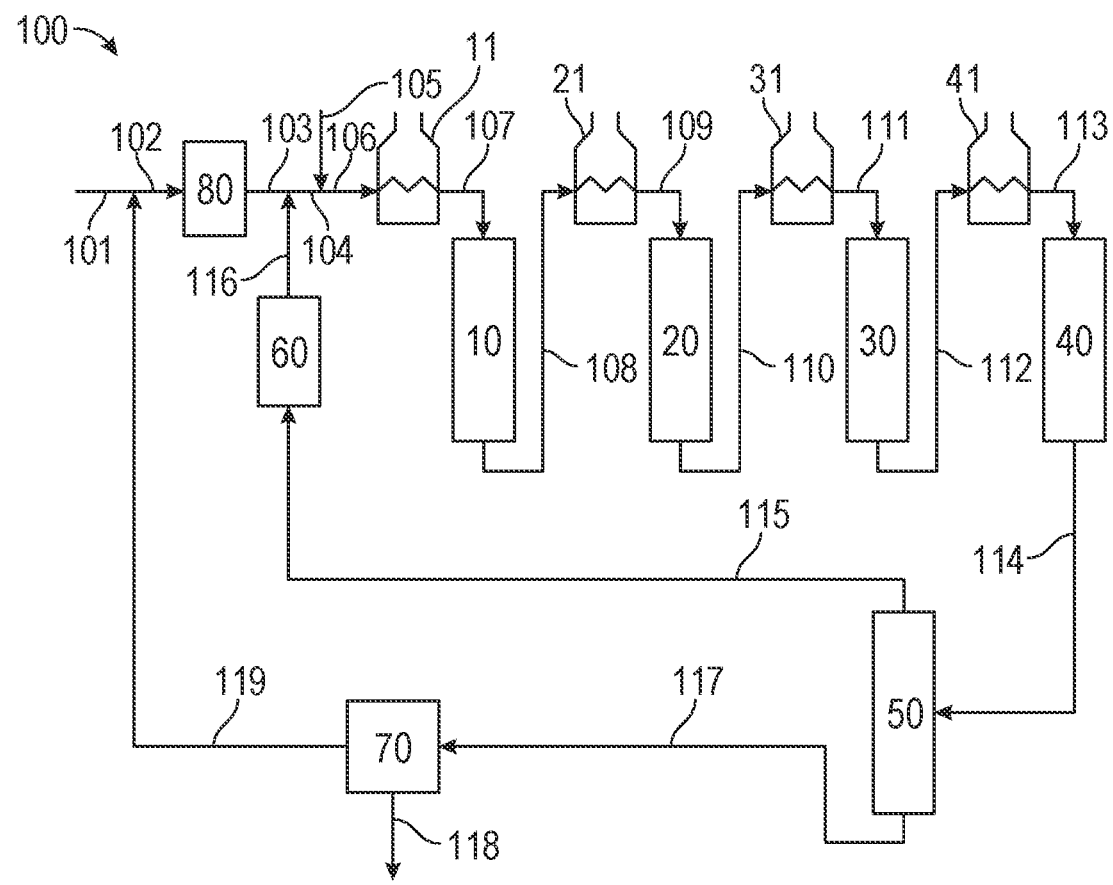
FIG. 1 provides a process flow diagram illustrating one type of aromatization reactor system for producing aromatic hydrocarbons according to an aspect of the present disclosure.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

As the various features of the subject matter of this disclosure are described, within particular aspect, a combination or combinations of the different features may be envisioned. For every aspect of every feature disclosed herein, all combinations that do not detrimentally affect the designs, compositions, systems, processes, or methods described herein are contemplated with or without the express description of that particular combination. Therefore, unless explicitly stated to the contrary, any aspect of feature disclosed here may be combined to describe and disclose the inventive designs, compositions, systems, processes, or methods consistent with the entire disclosure.

While compositions and methods are described in terms of "comprising" various components or steps, the compositions and methods can also "consist essentially of" or "consist of" the various components or steps, unless stated otherwise.

The terms "including", "with", and "having", as used herein, are defined as comprising (i.e., open language), unless specified otherwise.

The terms "a," "an," and "the" are intended to include plural alternatives, e.g., at least one. For instance, the disclosure of "a zeolite," "a diluent," "a catalyst," and the like, is meant to encompass one, or mixtures or combinations of more than one, zeolite, diluent, catalyst, and the like, unless otherwise specified.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. For example, by disclosing a weight percentage of from 1.0 wt % to 2.0 wt %, Applicant's intent is to recite individually 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, and 2.0 wt %, including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicants state that one or more steps in the processes disclosed herein can be conducted at a temperature in a range from 10° C. to 75° C., this range should be interpreted as encompassing temperatures in a range from "about" 10° C. to "about" 75° C. unless otherwise stated.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, each use of the term "about" can, independently, mean±20% of the stated value, ±15% of the stated value, ±10% of the stated value, ±5% of the stated value, or ±3% of the stated value.

Applicants reserve the right to proviso out or exclude any individual members of any such group of values or ranges, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference or prior disclosure that Applicants can be unaware of at the time of the filing of the application.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to hexane or hexanes includes n-hexane, 2-methylpentane, 3-methylpentane, 2,2-dimethylbutane, and 2,3-dimethylbutane; and a general reference to a butyl group includes an n-butyl group, a sec-butyl group, an iso-butyl group, and a t-butyl group.

The term "substituted" when used to describe a group, for example, when referring to a substituted analog of a particular group, is intended to describe the compound or group wherein any non-hydrogen moiety formally replaces hydrogen in that group or compound, and is intended to be non-limiting. A compound or group can also be referred to herein as "unsubstituted" or by equivalent terms such as "non-substituted," which refers to the original group or compound. "Substituted" is intended to be non-limiting and include inorganic substituents or organic substituents as specified and as understood by one of ordinary skill in the art.

The terms "contact product," "contacting," and the like, are used herein to describe compositions and methods wherein the components are contacted together in any order, in any manner, and for any length of time, unless specified otherwise. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, "contacting" two or more components can result in a reaction product or a reaction mixture. Consequently, depending upon the circumstances, a "contact product" can be a mixture, a reaction mixture, or a reaction product.

"Conditions for aromatizing aliphatic hydrocarbons" means conditions for aromatizing at least a portion of the aliphatic hydrocarbons in a feedstock containing aliphatic hydrocarbons when contacted with a catalyst as described herein, such that the catalyst bed discharge comprises at least some aromatic hydrocarbons. Some unreacted aliphatic hydrocarbons will also be present in the catalyst bed discharge.

Generally, groups of elements are indicated using the numbering scheme indicated in the version of the periodic table of elements published in Chemical and Engineering News, 63(5), 27, 1985. In some instances, a group of elements may be indicated using a common name assigned to the group; for example, alkali metals for Group 1 elements, alkaline earth metals for Group 2 elements, transition metals for Group 3-12 elements, halogens or halides for Group 17 elements, and the like.

In one aspect, a chemical "group" may be defined or described according to how that group is formally derived from a reference or "parent" compound, for example, by the number of hydrogen atoms removed from the parent compound to generate the group, even if that group is not literally synthesized in such a manner. These groups may be utilized as substituents or coordinated or bonded to metal atoms. By way of example, an "alkyl group" formally may be derived by removing one hydrogen atom from an alkane. The disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

As used herein, the term "hydrocarbon" refers to a compound containing only carbon and hydrogen atoms. Other identifiers may be utilized to indicate the presence of particular groups, if any, in the hydrocarbon. For example, halogenated hydrocarbon indicates the presence of one or more halogen atoms replacing an equivalent number of hydrogen atoms in the hydrocarbon.

An "aromatic" compound or "aromatic hydrocarbon" is a compound containing a cyclically conjugated double bond system that follows the Hückel (4n+2) rule and contains (4n+2) pi-electrons, where n is an integer from 1 to 5. Aromatic hydrocarbons include "arenes" (aromatic compounds, for example, benzene, toluene, and xylenes) and "heteroarenes" (heteroaromatic compounds formally derived from arenes by replacement of one or more methine (—C≡) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)). As disclosed herein, the term "substituted" may be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers may be utilized to indicate the presence of particular groups, if any, in the alkane (for example, halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group may be linear or branched unless otherwise specified.

A "cycloalkane" is used herein to refer to a saturated cyclic hydrocarbon, with or without side chains, for example, cyclobutane, cyclopentane, cyclohexane, methyl cyclopentane, and methyl cyclohexane. Other identifiers may be utilized to indicate the presence of particular groups, if any, in the cycloalkane (for example, halogenated cycloalkane indicates the presence of one or more halogen atoms replacing an equivalent number of hydrogen atoms in the cycloalkane).

An "aliphatic" compound or "aliphatic hydrocarbon" is defined according to the IUPAC recommended definition to mean an acyclic or cyclic, saturated or unsaturated carbon compound, excluding aromatic compounds. That is, an aliphatic compound is a non-aromatic organic compound.

The term "hydrocarbyl group" is used herein in accordance with the definition specified by IUPAC: a univalent group formed by removing a hydrogen atom from a hydrocarbon (that is, a group containing only carbon and hydrogen). Thus, a hydrocarbyl group includes alkyl groups (linear or branched), cycloalkyl groups, alkenyl groups, aryl groups, and the like. Non-limiting examples of hydrocarbyl groups include methyl, ethyl, butyl, hexyl, phenyl, tolyl, propenyl, and the like.

As used herein, a "paraffin" refers to a non-cyclic, linear or branched saturated hydrocarbons and includes alkanes. For example, a $C_6$ paraffin is a non-cyclic, linear or branched hydrocarbon having 6 carbon atoms per molecule. Normal hexane, methylpentanes, dimethylbutanes are examples of C6 paraffins. A paraffin-containing feed comprises non-cyclic saturated hydrocarbons, such as normal paraffins, isoparaffins, and mixtures thereof.

As used herein, a "naphthene" and "naphthenic" are terms used to describe cyclic saturated hydrocarbons, and includes cycloalkanes and their alkyl-substituted analogs. Therefore, a "naphthene" is a cyclic, saturated hydrocarbon having one or more rings of carbon atoms in its chemical structure and is used herein to mean the same as "cycloalkane." If such a cyclic structure includes unsaturated carbon-carbon bonds but is not aromatic, such compounds would be aliphatic, but not naphthenic. In some embodiments, a naphthene is a cyclic, saturated hydrocarbon having from 5 to 8 carbon atoms in the cyclic structure, including substituted (particularly alkyl-substituted) analogs thereof.

As used herein, "olefin" is an acyclic or cyclic hydrocarbon having one or more carbon-carbon double bonds, apart from the formal ones in aromatic compounds. Olefins include alkenes, cycloalkenes, and corresponding polyenes.

As used herein, "naphtha" is a petroleum distillate fraction boiling within the range of from 50° F. (10° C.) to 550° F. (260° C.). In some embodiments, naphtha boils within the range of 70° F. (21° C.) to 450° F. (232° C.), and more typically within the range of 80° F. (27° C.) to 400° F. (204° C.), and often within the range of 90° F. (32° C.) to 360° F. (182° C.). In some embodiments, at least 85 vol. % (volume percent) of naphtha boils within the range of from 50° F. (10° C.) to 550° F. (260° C.), and more typically within the range of from 70° F. (21° C.) to 450° F. (232° C.). In embodiments, at least 85 vol. % of naphtha is in the $C_4$ to $C_{12}$ range, and more typically in the $C_5$ to $C_{11}$ range, and often in the $C_6$ to $C_{10}$ range. Naphtha can include, for example, straight run naphthas, paraffinic and naphthenic raffinates from aromatic extraction or adsorption, $C_6$ to $C_{10}$ paraffin and naphthene containing feeds, bio-derived naphtha, naphtha from hydrocarbon synthesis processes, including Fischer-Tropsch and methanol synthesis processes, as well as naphtha from other refinery processes, such as hydrocracking or conventional reforming.

As used herein, the term "convertible hydrocarbon", "convertible $C_6$ species" or "convertible $C_7$ species" refers to hydrocarbon compounds that may be selectively converted to aromatic products such as aromatic hydrocarbons under aromatization process conditions. In some aspects, the feed stream comprises a highly branched hydrocarbon that is not selectively converted to aromatic hydrocarbons under conventional aromatization process conditions. While a "highly branched hydrocarbon" is a hydrocarbon that is not selectively convertible to form aromatic hydrocarbons under conventional aromatization process conditions. For example, a "highly branched hydrocarbon" can comprise highly-branched hydrocarbons having six or seven carbon atoms with an internal quaternary carbon or hydrocarbons having six carbons atoms and two adjacent internal tertiary carbons or mixtures thereof. The highly branched hydrocarbons may include, but are not limited to, dimethylbutanes (for example, 2,2-dimethylbutane, 2,3-dimethylbutane), dimethylpentanes (for example, 2,2-dimethylpentane, 3,3-dimethylpentane), trimethylbutanes (for example, 2,2,3-trimethylbutane) and mixtures thereof. The highly branched hydrocarbons are not selectively convertible aromatic hydrocarbons and instead convert to light hydrocarbons under aromatization process conditions. The convertible components may comprise methylpentanes, methylhexanes, dimethylpentanes or mixtures thereof, and/or the selectively convertible components may comprise at least one of 2-methylpentane, 3-methylpentane, 2,4-dimethylpentane, 2,3-dimethylpentane, n-hexane, 2-methylhexane, 3-methylhexane, n-heptane, or mixtures thereof. The selectively convertible components readily convert to aromatic hydrocarbons without the production of light hydrocarbons.

As used herein "primary aromatic hydrocarbon," "primary aromatic product," "desired hydrocarbon product," and "particular aromatic species" are used interchangeably and refer to the aromatic hydrocarbons that is the desired end product of the reaction and comprises aromatic hydrocarbons that has been generated from a feed that includes a renewable cellulose source. For example, the desired product may be benzene while toluene and xylenes may be by-products, or the desired product may be xylenes while benzene and toluene may be by-products.

A "Group 8-10" metal includes each of the Group 8 metals iron, ruthenium, and osmium, each of the Group 9 metals cobalt, rhodium, and iridium, and each of the Group 10 metals nickel, palladium, and platinum. The Group 8-10 metals may also be referred to using the earlier nomenclature, the Group VIII metals, which also encompasses all of iron, ruthenium, osmium, cobalt, rhodium, iridium, nickel, palladium, and platinum. Generally, describing the catalyst as a Group 8-10 metal catalyst or as comprising a Group 8-10 metal, is intended to encompass catalysts that include at least one Group 8-10 metal and optionally other metals, such as Pt/Sn and Pt/Re.

The term "platinum metal" is used herein to designate the 2nd and 3rd row transition metals of Groups 8-10, namely, ruthenium, osmium, rhodium, iridium, palladium, and platinum.

The term "noble metal" is generally used to describe specific metals that are resistant to corrosion and this term is used herein to include certain $2^{nd}$ and $3^{rd}$ row transition metals, but no first row transition metals. Generally, noble metals include ruthenium, osmium, rhodium, iridium, palladium, platinum, silver, and gold. Accordingly, the Group 8-10 noble metals are also the platinum metals.

As used herein, the term "bound", is intended to describe a zeolite-binder combination or other support-binder combination that is formed into aggregates such as pellets, pills, extrudates and the like. The term "catalyst base", as used herein, refers to a bound zeolite or bound support.

The term "catalyst" is used herein in a broad sense and includes the final catalyst as well as precursors of the final catalyst. Precursors of the final catalyst include, for example, the calcined form of the catalyst containing the catalytic metal and also the catalyst prior to activation by reduction. The term "catalyst" is thus used to refer to the activated catalyst in some contexts herein, and in other contexts to refer to precursor forms of the catalyst, as will be understood by skilled persons from the context.

The term "sulfur sensitive" describes catalysts that are particularly sensitive to the presence of sulfur in the feedstock. Generally, these catalysts require the amount of sulfur in the feedstock to be reduced to less than 5 ppm by hydrotreating, adsorbents, or a combination thereof. As used herein the terms "aromatization reactor system," "aromatization reactor unit," "catalytic reactor system," and "catalytic reactor unit" when referring to aromatization reactor systems also refer to the reactor vessel, reactor internals, and associated processing equipment as the context allows, including but not limited to the catalyst, inert packing materials, scallops, flow distributors, center pipes, reactor ports, catalyst transfer and distribution system, furnaces and other heating devices, heat transfer equipment, and piping. The aromatization reactor system described may comprise a fixed catalyst bed system, a moving catalyst bed system, a fluidized catalyst bed system, or combinations thereof. Such aromatization reactor systems may be batch or continuous. In a fixed bed system, the flow of the feed can be upward, downward, or radially through the reactor. In an aspect, the first catalyst bed, the intermediate catalyst beds, and the last catalyst bed are in a radial flow reactor.

The term "catalyst bed", such as first, second, or intermediate catalyst bed, is used herein to refer to a specific catalyst composition which constitutes at least a portion of, or all of, the catalyst material in a single aromatization reactor. For example, a "first catalyst bed" can occupy the entirety of one aromatization reactor, or it can occupy a portion of one aromatization reactor while a "second catalyst bed" occupies the remaining portion of the aromatization reactor. More typically, each catalyst bed can occupy the entirety of one aromatization reactor. Generally, and unless specified otherwise or the context requires otherwise, multiple aromatization reactors are described as having different catalyst beds, regardless of whether their catalysts have identical or different compositions.

The term "halogen" has its usual meaning and, as the context allows, includes halides. Therefore, examples of halogens include fluorine, fluoride, chlorine, chloride, bromine, bromide, iodine, and iodide. Further, the use of the term "fluoride" and "chloride" when describing the catalyst components or catalyst composition such as weight percentage or mole percentage of these components, does not depend on their presence in the catalyst in any particular molecular or ionic form.

Molar selectivities are defined as follows:

$$\text{Benzene selectivity: } S_{Bz} = \frac{\dot{n}_{Bz,prod}}{\dot{n}_{convC6,feed} - \dot{n}_{convC6,prod}} \quad \text{Eq. 1}$$

$$\text{Toluene selectivity: } S_{Tol} = \frac{\dot{n}_{Tol,prod}}{\dot{n}_{convC7,feed} - \dot{n}_{convC7,prod}} \quad \text{Eq. 2}$$

$$\text{Benzene + Toluene selectivity: } S_{Bz+Tol} = \quad \text{Eq. 3}$$
$$\frac{\dot{n}_{Bz,prod} + \dot{n}_{Tol,prod}}{\dot{n}_{convC6,C7\,feed} - \dot{n}_{convC6,C7\,prod}}$$

$$\text{Aromatics selectivity: } S_{arom} = \frac{\dot{n}_{Bz,prod} + \dot{n}_{Tol,prod} + \dot{n}_{C8+arom,prod}}{\dot{n}_{convC6-C8+,feed} - \dot{n}_{convC6-C8+,prod}} \quad \text{Eq. 4}$$

Conversion is defined as the number of moles converted per mole of "convertible" hydrocarbons fed as follows:

$$C_6 \text{ conversion: } X_{C6} = \frac{\dot{n}_{convC6,feed} - \dot{n}_{convC6,prod}}{\dot{n}_{convC6,feed}} \quad \text{Eq. 5}$$

$$C_7 \text{ conversion: } X_{C7} = \frac{\dot{n}_{convC7,feed} - \dot{n}_{convC7,prod}}{\dot{n}_{convC7,feed}} \quad \text{Eq. 6}$$

$$C_7 \text{ conversion: } X_{C6+C7} = \quad \text{Eq. 7}$$
$$\frac{\dot{n}_{convC6,feed} + \dot{n}_{convC7,feed} - \dot{n}_{convC6,prod} - \dot{n}_{convC7,prod}}{\dot{n}_{convC6,feed} + \dot{n}_{convC7,feed}}$$

In equations 1-7 selectivity and conversion calculations, the following abbreviations are used: $\dot{n}$ indicates a molar flow rate in a continuous reactor or the number of moles in a batch reactor; "conv" is used to mean "convertible" and represents the convertible $C_6$, $C_7$, or $C_6$-$C_8$+ compounds in the starting feedstock or feed ("feed") or remaining in the product ("prod"), as indicated.

A "tonne" is used herein to refer to a metric ton, that is, a unit of mass equal to 1,000 kilograms.

The Abstract of this application is not intended to be used to construe the scope of the claims or to limit the scope of the subject matter that is disclosed herein, but rather to satisfy the requirements of 37 C.F.R. § 1.72(b), to enable the United States Patent and Trademark Office and the public generally to determine quickly from a cursory inspection the nature and gist of the technical disclosure. Moreover, any headings that are employed herein are also not intended to be used to construe the scope of the claims or to limit the scope of the subject matter that is disclosed herein. Any use of the past tense to describe any example otherwise indicated as constructive or prophetic is not intended to reflect that the constructive or prophetic example has actually been carried out.

All publications and patents mentioned herein are incorporated herein by reference in their entireties for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

DETAILED DESCRIPTION

The present disclosure is directed generally to a system and method for producing aromatic hydrocarbons from aliphatic hydrocarbons, using a series of catalyst beds, in which the fluorine content, the chlorine content, or both the fluorine and chlorine content of the catalyst composition can vary in at least two adjacent catalyst beds. More specifically, this disclosure provides processes and systems for reforming hydrocarbons by using a series of adiabatic reactors and catalysts, in which the catalysts in at least one front or upstream catalyst bed includes a higher fluoride content, higher chloride content, or both a higher fluoride content and a higher chloride content that the catalysts in one or more downstream catalyst beds. It has been unexpectedly discovered that by using a higher weight percent of fluoride and/or chloride in at least one upstream catalyst bed or reactor as compared to one or more downstream catalyst beds or reactors can extend the useful life of the catalyst system by sustaining its selectivity for longer than expected.

This disclosure also demonstrates the different roles of fluoride and chloride in the operation of the aromatization catalysts. It has been observed that fluoride can act as a selectivity enhancer, while the chloride can improve the distribution the platinum in the catalyst. Both fluoride and chloride also function in a synergistic fashion, and a catalyst containing both halides is superior to a catalyst containing only one halide and superior to an additive effect of using individual halides. In this disclosure we demonstrate that loading the top portion of a catalyst bed with a high halide catalyst can increase the overall run length through the evolving halides interacting with the catalyst downstream. This result is unexpected, because during the operational lifetime of the catalyst, fluoride can be slowly evolved into the product, which can induce a decrease in selectivity and run length. Chloride also can be evolved, however the evolution of chloride is observed to promote the sintering of the platinum, which also can decreases the selectivity and the activity. Accordingly, it has been observed that loading a fixed bed reactor with the top portion such as the top half of the bed comprising of a high halide catalyst, either high fluorine, high chloride, or both, followed by a reduction step improves the performance of the catalyst in the bottom half of the catalyst bed.

GENERAL CONSIDERATIONS

In an aspect, this disclosure provides for two contiguous catalysts or catalyst beds in series that comprise an inorganic support, a Group 8-10 metal, and the stated fluoride or chloride concentration in a first, upstream catalyst relative to the weight of that upstream catalyst prior to reduction. The catalyst or catalyst bed downstream, including one immediately downstream, can comprise a comparatively lower weight percentage of fluoride or chloride relative to the weight of that downstream catalyst prior to reduction.

Therefore, in an aspect, this disclosure provides a process for reforming hydrocarbons, the process comprising:
  a) in a first catalyst bed, contacting a feedstock containing aliphatic hydrocarbons with a first catalyst comprising an inorganic support, a Group 8-10 metal, and at least or about 1.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons;
  b) optionally, in one or more intermediate catalyst beds in series, contacting the first catalyst bed discharge with the one or more independently selected intermediate catalysts, each comprising an inorganic support, a Group 8-10 metal, and fluoride, under conditions for aromatizing aliphatic hydrocarbons to form one or more intermediate catalyst bed discharges comprising aromatic hydrocarbons and aliphatic hydrocarbons; and
  c) in a last catalyst bed, [1] contacting the first catalyst bed discharge with a last catalyst or [2] when one or more optional intermediate catalyst beds are present, contacting the one or more intermediate catalyst bed discharges with a last catalyst, wherein the last catalyst comprises an inorganic support, a Group 8-10 metal, and at least or about 0.7 wt % fluoride relative to the weight of the last catalyst prior to reduction, under conditions for aromatizing aliphatic hydrocarbons to form a last catalyst bed discharge comprising aromatic products;
  wherein the fluoride concentration of the first catalyst or the fluoride concentration of at least one of the intermediate catalysts, when present, is greater than the fluoride concentration of the last catalyst prior to reduction.

Similarly, in another aspect, this disclosure provides a process for reforming hydrocarbons, the process comprising:
  a) in a first catalyst bed, contacting a feedstock containing aliphatic hydrocarbons with a first catalyst comprising an inorganic support, a Group 8-10 metal, and at least or about 1.5 wt % chloride relative to the weight of the first catalyst prior to reduction, under conditions for aromatizing aliphatic hydrocarbons to form a first catalyst bed discharge comprising aromatic hydrocarbons and aliphatic hydrocarbons;
  b) optionally, in one or more intermediate catalyst beds in series, contacting the first catalyst bed discharge with the one or more independently selected intermediate catalysts, each comprising an inorganic support, a Group 8-10 metal, and chloride, under conditions for aromatizing aliphatic hydrocarbons to form one or more intermediate catalyst bed discharges comprising aromatic hydrocarbons and aliphatic hydrocarbons; and
  c) in a last catalyst bed, [1] contacting the first catalyst bed discharge with a last catalyst or [2] when one or more optional intermediate catalyst beds are present, contacting the one or more intermediate catalyst bed discharges with a last catalyst, wherein the last catalyst comprises an inorganic support, a Group 8-10 metal, and at least or about 0.5 wt % chloride relative to the weight of the last catalyst prior to reduction, under conditions for aromatizing aliphatic hydrocarbons to form a last catalyst bed discharge comprising aromatic products;

wherein the chloride concentration of the first catalyst or the chloride concentration of at least one of the intermediate catalysts, when present, is greater than the chloride concentration of the last catalyst prior to reduction.

These process aspects immediately above describe a "first" and "last" catalyst in which two catalyst beds that are adjacent each other. However, these aspects also describe one or more optional intermediate catalyst beds in series situated between the upstream (first) and downstream (last) catalyst beds. Therefore, the recited weight percentages of fluoride or chloride in the first and the last catalysts are applicable to either adjacent catalysts or to two catalysts that are not adjacent, but which are characterized by the recited fluoride or chloride concentrations.

This disclosure also provides a catalytic hydrocarbon reforming system, the system comprising:

two or more catalyst beds in series, including an upstream first catalyst bed and a downstream last catalyst bed;

a first catalyst in the first catalyst bed comprising an inorganic support, a Group 8-10 metal, and at least or about 1.0 wt % fluoride relative to the weight of the first catalyst prior to reduction;

optionally, one or more independently selected intermediate catalysts in the one or more intermediate catalyst beds downstream of the first catalyst bed, each intermediate catalyst comprising an inorganic support, a Group 8-10 metal, and fluoride; and a last catalyst in the last catalyst bed downstream of the first catalyst bed and any optional intermediate catalyst beds, the last catalyst comprising an inorganic support, a Group 8-10 metal, and at least or about 0.7 wt % fluoride relative to the weight of the last catalyst prior to reduction;

wherein the fluoride concentration of the first catalyst or the fluoride concentration of at least one of the intermediate catalysts, when present, is greater than the fluoride concentration of the last catalyst prior to reduction.

Similarly, in another aspect, this disclosure also provides a catalytic hydrocarbon reforming system, the system comprising:

two or more catalyst beds in series, including an upstream first catalyst bed and a downstream last catalyst bed;

a first catalyst in the first catalyst bed comprising an inorganic support, a Group 8-10 metal, and at least or about 1.5 wt % chloride relative to the weight of the first catalyst prior to reduction;

optionally, one or more independently selected intermediate catalysts in the one or more intermediate catalyst beds downstream of the first catalyst bed, each intermediate catalyst comprising an inorganic support, a Group 8-10 metal, and chloride; and a last catalyst in the last catalyst bed downstream of the first catalyst bed and any optional intermediate catalyst beds, the last catalyst comprising an inorganic support, a Group 8-10 metal, and at least or about 0.5 wt % chloride relative to the weight of the last catalyst prior to reduction;

wherein the chloride concentration of the first catalyst or the chloride concentration of at least one of the intermediate catalysts, when present, is greater than the chloride concentration of the last catalyst prior to reduction.

These system aspects immediately above describe a "first" and "last" catalyst in which two catalyst beds are adjacent each other. However, one or more optional intermediate catalyst beds in series are also described situated between the upstream (first) and downstream (last) catalyst beds in these systems. Therefore, the recited weight percentages of fluoride or chloride in the first and the last catalysts are applicable to either adjacent catalysts or to two catalysts that are not adjacent, but which are characterized by the recited fluoride or chloride concentrations.

Fluoride and Chloride Concentrations

In each of the recited processes and systems, there are practical upper limits of the concentrations of the fluoride and chloride in the catalysts. For example, in the fluoride-containing catalysts, the first catalyst can comprise up to about 5.0 wt %, up to about 4.0 wt %, up to about 3.5 wt %, up to about 3.0 wt %, or up to about 2.5 wt % fluoride relative to the weight of the first catalyst prior to reduction, and the last catalyst comprises up to about 4.0 wt %, up to about 3.0 wt %, up to about 2.5 wt %, up to about 2.0 wt %, or up to about 1.5 wt % fluoride relative to the weight of the last catalyst prior to reduction. In the chloride-containing catalysts, the first catalyst can comprise up to about 5.0 wt %, up to about 4.0 wt %, up to about 3.5 wt %, up to about 3.0 wt %, or up to about 2.5 wt % chloride relative to the weight of the first catalyst prior to reduction, and the last catalyst can comprise up to about 3.0 wt % up to about 2.5 wt %, up to about 2.0 wt %, or up to about 1.5 wt % chloride relative to the weight of the last catalyst prior to reduction.

According to an aspect of the catalyst compositions or processes disclosed herein, any first catalyst, any one or more of the intermediate catalysts, any last catalyst, or any combination thereof in which the fluoride concentration is set out, and independently of any other catalyst described in the composition or process, can further comprise chloride in any concentration as disclosed herein. Similarly, in any catalyst composition or processes disclosed herein, any first catalyst, any one or more of the intermediate catalysts, any last catalyst, or any combination thereof in which the chloride concentration is set out, and independently of any other catalyst described in the composition or process, can further comprise fluoride in any concentration as disclosed herein.

Regarding fluoride concentrations, any first catalyst as described herein also can comprise fluoride in a concentration range of from about 1.0 wt % to about 4.0 wt %, from about 1.2 wt % to about 3.2 wt %, from about 1.5 wt % to about 2.8 wt %, from about 1.7 wt % to about 2.5 wt %, or from about 1.8 wt % to about 2.3 wt % relative to the weight of the first catalyst prior to reduction. Any one or more of the intermediate catalysts, the last catalyst, or any combination thereof independently can comprise fluoride in a concentration range of from about 0.7 wt % to about 2.5 wt %, from about 0.8 wt % to about 2.3 wt %, from about 0.9 wt % to about 2.0 wt %, from about 1.0 wt % to about 2.0 wt %, or from about 1.2 wt % to about 1.8 wt % relative to the weight of the respective intermediate catalyst or last catalyst prior to reduction.

In another aspect, any of the fluoride-containing catalysts set out herein, whether a first catalyst, any one or more of the intermediate catalysts, the last catalyst, or any combination thereof, can independently further comprise chloride in a concentration range of from about 1.5 wt % to about 4.0 wt %, from about 1.8 wt % to about 3.6 wt %, from about 2.2 wt % to about 3.4 wt %, or from about 2.0 wt % to about 3.3 wt % relative to the weight of the respective first catalyst, intermediate catalyst, or last catalyst prior to reduction. Alternatively, any of the fluoride-containing catalysts set out herein, whether a first catalyst, any one or more of the intermediate catalysts, the last catalyst, or any combination thereof, can independently further comprise chloride in a concentration range of from about 0.5 wt % to about 2.5 wt %, from about 0.6 wt % to about 2.3 wt %, from about 0.7 wt % to about 2.0 wt %, or from about 0.8 wt % to about 1.7 wt % relative to the weight of the respective first catalyst, intermediate catalyst, or last catalyst prior to reduction. In these aspects, the chloride concentration of these first catalysts can be greater than the chloride concentration of these last catalyst prior to reduction. The chloride concentration of these catalysts also can be greater than the chloride concentration of an adjacent downstream catalyst prior to reduction.

Regarding chloride concentrations, any first catalyst as described herein also can comprise chloride in a concentration range of from about 1.5 wt % to about 4.0 wt %, from about 1.8 wt % to about 3.6 wt %, from about 2.2 wt % to about 3.4 wt %, or from about 2.0 wt % to about 3.3 wt % relative to the weight of the first catalyst prior to reduction. Any one or more of the intermediate catalysts, the last catalyst, or any combination thereof independently can comprise chloride in a concentration range of from about 0.5 wt % to about 2.5 wt %, from about 0.6 wt % to about 2.3 wt %, from about 0.7 wt % to about 2.0 wt %, or from about 0.8 wt % to about 1.7 wt % relative to the weight of the respective intermediate catalyst or last catalyst prior to reduction.

In another aspect, any of the chloride-containing catalysts set out herein, whether a first catalyst, any one or more of the intermediate catalysts, the last catalyst, or any combination thereof, can independently further comprise fluoride in a concentration range of from about 1.0 wt % to about 4.0 wt %, from about 1.2 wt % to about 3.2 wt %, from about 1.5 wt % to about 2.8 wt %, from about 1.7 wt % to about 2.5 wt %, or from about 1.8 wt % to about 2.3 wt % relative to the weight of the respective first catalyst, intermediate catalyst, or last catalyst prior to reduction. Alternatively, any of the chloride-containing catalysts set out herein, whether a first catalyst, any one or more of the intermediate catalysts, the last catalyst, or any combination thereof, can independently further comprise fluoride in a concentration range of from about 0.7 wt % to about 2.5 wt %, from about 0.8 wt % to about 2.3 wt %, from about 0.9 wt % to about 2.0 wt %, from about 1.0 wt % to about 2.0 wt %, or from about 1.2 wt % to about 1.8 wt % relative to the weight of the respective first catalyst, intermediate catalyst, or last catalyst prior to reduction. In these aspects, the fluoride concentration of these first catalysts can be greater than the fluoride concentration of these last catalyst prior to reduction. The fluoride concentration of these catalysts also can be greater than the fluoride concentration of an adjacent downstream catalyst prior to reduction.

According to another aspect, any one or more of the first catalyst, the intermediate catalysts, and/or the last catalyst independently can comprise any weight ratio of chlorine to fluorine (Cl:F) disclosed herein, for example, from about 1.5:1 to about 8:1, from about 2:1 to about 5:1, or from about 3:1 to about 4.5:1. Moreover, any one or more of the first catalyst, the intermediate catalysts, and/or the last catalyst independently can comprise a weight ratio of chlorine to fluorine (Cl:F) of from about 1:10 to about 10:1, from about 1:5 to about 5:1, or from about 1:2 to about 2:1.

In embodiments, the fluoride concentration of the first catalyst can be from 10% to 50% greater than, from 25% to 65% greater than, or from 50% to 90% greater than the fluoride concentration of the last catalyst. In embodiments, the chloride concentration of the first catalyst can be from 10% to 50% greater than, from 25% to 65% greater than, or from 50% to 90% greater than the chloride concentration of the last catalyst.

In the processes and systems disclosed herein, for any of the fluoride-containing catalysts set out herein which further comprise chloride, the first catalyst may further comprise from about 0.5 wt % to about 5 wt % chloride relative to the weight of the first catalyst prior to reduction, and the last catalyst may further comprises from about 0.5 wt % to about 5 wt % chloride relative to the weight of the last catalyst prior to reduction. Further, in the processes and systems disclosed herein, for any of the chloride-containing catalysts set out herein which further comprise fluoride, the first catalyst can further comprise from about 0.5 wt % to about 5 wt % fluoride relative to the weight of the first catalyst prior to reduction, and the last catalyst can further comprises from about 0.5 wt % to about 5 wt % fluoride relative to the weight of the last catalyst prior to reduction. Also in embodiments of the processes and systems disclosed herein, any one or more of the first catalyst, the intermediate catalysts, and/or the last catalyst can comprise a combined concentration of fluoride and chloride of up to about 5 wt % relative to the weight of that catalyst prior to reduction.

Accordingly, in another aspect, the fluoride concentration (wt %) of each of the one or more independently selected intermediate catalysts at startup can be greater than or equal to the fluoride concentration of the last catalyst prior to reduction. The chloride concentration (wt %) of each of the one or more independently selected intermediate catalysts at startup can be greater than or equal to the chloride concentration of the last catalyst prior to reduction.

In further aspects, the fluoride concentration (wt %) of one or more independently selected intermediate catalysts at startup can be less than or equal to the fluoride concentration of the first catalyst prior to reduction and greater than or equal to the fluoride concentration of the last catalyst prior to reduction. Similarly, the chloride concentration (wt %) of one or more independently selected intermediate catalysts at startup can be less than or equal to the chloride concentration of the first catalyst prior to reduction and greater than or equal to the chloride concentration of the last catalyst prior to reduction.

Alternatively, in further aspects, the fluoride concentration (wt %) of one or more independently selected intermediate catalysts at startup can be greater than or equal to the fluoride concentration of the first catalyst prior to reduction and greater than or equal to the fluoride concentration of the last catalyst prior to reduction. Similarly, the chloride concentration (wt %) of one or more independently selected intermediate catalysts at startup can be greater than or equal to the chloride concentration of the first catalyst prior to reduction and greater than or equal to the chloride concentration of the last catalyst prior to reduction.

It is understood that the reduction of the catalysts in the catalyst beds results in a decrease in the halide concentration, such that the weight percentage of fluoride and/or chloride relative to the weight of the catalyst will drop from the weight percentages prior to reduction. As an example and not as a limitation, an upstream catalyst containing 1.5 wt % fluoride prior to reduction may contain approximately from about 0.6 wt % to about 1.0 wt % fluoride following reduction, based on the particular catalyst, the reduction conditions, and the like.

Generally, the feedstock for the aromatization process is naphtha, a petroleum distillate which may be generated from crude oils, gas condensates, or other suitable sources. The naphtha feedstock may comprise a light hydrocarbon, with a boiling range of about 20° C. to about 235° C. The naphtha feed may contain aliphatic, naphthenic, or paraffinic hydrocarbons. While catalytic aromatization typically refers to the conversion of naphtha, other feedstocks can be used. For example, paraffinic hydrocarbons, olefinic hydrocarbons, acetylenic hydrocarbons, cyclic paraffinic hydrocarbons, cyclic olefinic hydrocarbons, and mixtures thereof, and particularly saturated hydrocarbons also can be reformed to provide products enriched in aromatic hydrocarbons. The particular aromatic hydrocarbons that are produced are dependent upon, for example, the composition of the feedstock, and composition of the catalysts, and the reforming conditions.

It is generally recognized that the sulfur content of the feedstock can be minimized to prevent poisoning of the reforming catalyst. For example, the feed can contain less than 2 to 5 parts per million by weight (ppm) of sulfur because the presence of sulfur in the feed can decrease both the activity and the selectivity of the catalyst. Certain reforming catalysts are extremely sulfur sensitive, and sulfur levels in the feed of even less than 1 ppm, may severely deactivate these catalysts. For sulfur sensitive catalysts, the feed can contain less than 1,000 parts per billion by weight (ppb), less than 600 ppb, less than 300 ppb, less than 100 ppb, or from 5 ppb to 50 ppb. Aspects of removing sulfur from feedstocks are found in U.S. Pat. Nos. 5,059,304; 5,259,946; and 5,518,607, each of which is incorporated herein by reference.

Nonacidic Pt-L zeolites are examples of such sulfur sensitive catalysts. Examples of Pt-K-L zeolite catalysts are described in, for example, U.S. Pat. No. 4,104,320 (Bernard et al.), U.S. Pat. No. 4,544,539 (Wortel), and U.S. Pat. No. 4,987,109 (Kao et al.), each of which is incorporated herein by reference. Examples of Pt-K-L zeolite catalysts are described in U.S. Pat. No. 4,517,306 (Buss et al.), which is incorporated herein by reference. It is disclosed in U.S. Pat. No. 4,456,527, which is incorporated herein by reference, that such catalysts are able to achieve satisfactory run lengths only when the sulfur content of the feed is substantially reduced. The lower the sulfur content of the feed, the longer the run length of the catalyst.

In an aspect, the upstream "high halide" reforming catalyst can contain up to, about, or more than about 50 weight % additional halide, whether fluoride or chloride, than the amount of halide in a conventional or standard catalyst formulation. For example, if a conventional halide loading in a reforming catalyst is about 1.0 wt % halide, and the high halide reforming catalyst can, in this example, have up to about 1.5 wt % halide. In some aspects, as compared to the downstream catalysts, the upstream high halide catalysts can have about 10 wt % additional halide, about 20 wt % additional halide, about 30 wt % additional halide, about 40 wt % additional halide, about 50 wt % additional halide, about 60 wt % additional halide, about 70 wt % additional halide, about 80 wt % additional halide, about 90 wt % additional halide, or about 100 wt % additional halide than the amount of halide in a downstream catalyst.

Catalyst Beds and Reactors

As described in the Definitions section, the term "catalyst bed" is used herein to refer to a specific catalyst composition which constitutes at least a portion of, or all of, the catalyst material in a single aromatization reactor. For example, a "first catalyst bed" can occupy the entirety of one aromatization reactor, or it can occupy a portion of one aromatization reactor. Therefore, in an aspect, the process for reforming hydrocarbons or a catalytic hydrocarbon reforming system according to this disclosure can have each of the first catalyst bed, the one or more intermediate catalyst beds, and the last catalyst bed in different reactors. Alternatively, two adjacent catalyst beds in the series, meaning two adjacent catalysts having different specific catalyst compositions, can be in a single reactor. Alternatively still, more than two adjacent catalyst beds in the series can be in a single reactor. Typically, each distinct catalyst bed, meaning each distinct catalyst composition, is in a single reactor.

According to an aspect, the aromatization reactors in series can include 2, 3, 4, 5, 6, 7, 8, 9, 10 or more reactors in series. In one aspect, there is provided a process for reforming hydrocarbons or a catalytic hydrocarbon reforming system, wherein: the process or system includes from 1 to 6 intermediate catalyst beds comprising from 1 to 6 intermediate catalysts, respectively; and the first catalyst bed, the 1 to 6 intermediate catalyst beds, and the last catalyst bed are all in different reactors. In one aspect, the reactor system includes 4 intermediate catalyst beds, or alternatively, 5 intermediate catalyst beds.

In another aspect, this disclosure provides a process for reforming hydrocarbons and further discloses a catalytic hydrocarbon reforming system, wherein: the process or system includes from 1 to 6 intermediate catalyst beds comprising from 1 to 6 intermediate catalysts, respectively, the first catalyst bed, the 1 to 6 intermediate catalyst beds, and the last catalyst bed are all in different reactors, and the fluoride concentration and the chloride concentration (wt %) in each of the 1 to 6 intermediate catalysts at startup can be selected independently of the fluoride concentration and the chloride concentration in any other catalyst, such that the fluoride concentration and the chloride concentration of any or all of the first catalyst bed and the one or more intermediate catalyst beds is greater than the fluoride concentration and the chloride concentration of the last catalyst bed prior to reduction. In a further aspect, the process or system can include from 1 to 6 or more (e.g. 7, 8, or 9) intermediate catalyst beds comprising from 1 to 6 or more (e.g. 7, 8, or 9) intermediate catalysts, respectively, that are distributed among less than this number of reactors. That is, at least two adjacent catalysts and catalyst beds selected from the first catalyst bed, the 1 to 6 intermediate catalyst beds, and the last catalyst bed are in the same reactor.

For example, in a further aspect, the process and/or system of this disclosure can include 4 or 5 intermediate catalyst beds, wherein each of the first, the intermediate, and the last catalyst beds is in its own reactor. In one other aspect, this disclosure provides a process for reforming hydrocarbons or a catalytic hydrocarbon reforming system, wherein: the process or system includes 4 or 5 intermediate catalyst beds, each comprising its own respective intermediate catalyst; the first catalyst bed, the 4 or 5 intermediate catalyst beds, and the last catalyst bed are each in different reactors; and the volume of each of the 4 or 5 intermediate reactors is greater than or equal to the volume of the first reactor and less than or equal to the volume of the last reactor.

By way of example, in embodiments in which the process or system includes 4 intermediate catalyst beds, each comprising its own respective intermediate catalyst and each in different reactors, the volume of each of the 4 intermediate reactors and the last reactor is greater than or equal to volume of the reactor immediately upstream that reactor. In one aspect, the relative volumes of the first reactor, the 4 intermediate reactors, and the last reactor can be for example 10:10:10:20:20:30. In another aspect, the relative volumes of the first reactor, the 4 intermediate reactors, and the last reactor can be for example 10:10:10:15:20:25; alternatively, 10:10:10:20:30:40; or alternatively, 10:10:15:20:20:30; or alternatively, 10:10:15:20:25:30.

Generally, the process for reforming hydrocarbons involves the first catalyst bed discharge and/or the one or more intermediate catalyst bed discharges being heated prior to entering the subsequent catalyst bed. Therefore, this disclosure also provides a catalytic hydrocarbon reforming system comprising at least one furnace upstream of the first catalyst bed and/or any one or more of the intermediate catalyst beds.

According to an aspect, and while not intending to be bound by theory, it has been discovered that approximately the first 25% to 50% of the entire catalyst bed by volume, for example, AROMAX® reactors 1, 2, and 3 in a commercial plant with 6 or more reactors in series, may suffer low activities in the early part of the run due to what is believed to be higher than optimal halide concentrations, including fluoride concentrations. While not intending to be bound by theory, and regarding fluoride concentration, as the fluoride/fluorine evolves from the catalyst, it is believed that the fluoride will be transferred to the downstream catalyst(s) and/or inhibit loss of fluoride from the downstream catalyst(s) due to maintaining a vapor pressure of F in the gas phase. It is thought that the higher concentration of fluoride on the downstream catalyst may slow the rate of selectivity decline and the deactivation rate of the downstream catalyst. Since the upstream catalyst is operating at low extents of reaction, it is not expected that a higher than optimal fluoride levels will affect the selectivity or the run length of the upstream catalyst.

Aromatization Catalysts

Generally, the aromatization catalyst may comprise an inorganic support, a Group 8-10 metal such as platinum, and one or more halides such as fluorine, chlorine, iodine, bromine, or combinations thereof. In some embodiments, the catalyst may comprise Group 8-10 metals on an inorganic support such as platinum on alumina, Pt/Sn on alumina and Pt/Re on alumina. In other embodiments, the catalyst may comprise a platinum metal on a zeolitic support such as Pt, Pt/Sn and Pt/Re on zeolitic supports which may comprise a binder and zeolites such as L-zeolites, X-zeolite, mordenite, mazzite, and ZSM-5. Other catalyst can include the platinum metals, fluorine, and chlorine, typically on alkali- and alkaline-earth exchanged L-zeolites. The catalyst may comprise a large-pore zeolite as the inorganic support, charged with at least one Group 8-10 metal. For example, the catalysts in the described process and system may comprise a low-acidity silica-bound potassium L-type zeolite support, platinum, chloride, and fluoride. In embodiments, the Group 8-10 metal may comprise platinum, which may be more selective for dehydrocyclization and which may be more stable under reforming reaction conditions than other Group 8-10 metals. In other embodiments, the catalyst may comprise a Group 7 metal such as rhenium, or a Group 14 metal or metalloid such as tin.

Examples of reforming/aromatization catalysts that can be used in the methods and systems of this disclosure include, but are not limited to: the AROMAX® brand of catalysts available from the Chevron Phillips Chemical Company of The Woodlands, Texas, which can used, for example, as the downstream lower halide content catalysts in the systems and processes disclosed herein; the catalysts discussed in U.S. Pat. No. 6,812,180 to Fukunaga entitled "Method for Preparing Catalyst"; the catalysts disclosed in U.S. Pat. No. 7,153,801 to Wu entitled "Aromatization Catalyst and Methods of Making and Using Same"; and catalysts such as the halided zeolite catalysts (hiz-cat) described in U.S. Pat. No. 6,190,539 to Holtermann et al. entitled "Reforming Using a Bound Halided Zeolite Catalyst"; the catalysts disclosed in U.S. Pat. No. 7,902,105 to Khare entitled "Aromatization catalyst comprising prolongated silica and methods of making and using same"; the catalysts disclosed in U.S. Patent Publication No. 2018/0065115 to Alvez-Manoli entitled "Acidic Aromatization Catalyst with Improved Activity and Stability", each of which is incorporated herein by reference in its entirety. That is, any of the catalysts disclosed in these references can be used in preparing the upstream high halide reforming catalyst that can contain up to, about, or more than about 50 weight % additional halide such as fluoride than the amount of halide in a downstream catalyst and/or the amount of halide in a conventional catalyst formulation.

In an aspect, the catalyst may comprise a non-acidic zeolite support as the inorganic support, a Group 8-10 metal or other suitable metals, and one or more halides. Suitable halides include chloride, fluoride, bromide, iodide, or combinations thereof. Suitable Group 8-10 metals include iron, cobalt, nickel, ruthenium, rhodium, palladium, osmium, iridium, platinum, or combinations thereof. In a further aspect, the Group 8-10 metals can comprise or can be selected from rhodium, iridium, rhodium, iridium, palladium, and/or platinum, that is, one of more than one of the so-called platinum metals.

Inorganic supports for aromatization catalysts can generally include any inorganic oxide. These inorganic supports include bound large pore aluminosilicates (zeolites), amorphous inorganic oxides and mixtures thereof. Large pore aluminosilicates include, but are not limited to, L-zeolite, X-zeolite, mordenite, mazzite, ZSM-5 and the like. Amorphous inorganic oxides include, but are not limited to, aluminum oxide, silicon oxide and titania. Suitable bonding agents for the inorganic supports include, but are not limited to, silica, alumina, clays, titania, magnesium oxide, and combinations thereof.

The inorganic support may be an aluminosilicate, for example a zeolite. In embodiments, the aromatization catalyst may comprise a zeolitic catalyst. Zeolite materials, both natural and synthetic, can have appropriate catalytic properties for many hydrocarbon processes, including aromatization. Thus, zeolites can include the group of natural or synthetic hydrated aluminosilicate minerals that typically contain alkali and alkaline metals. Zeolites are characterized by a framework structure that encloses interconnected cavities occupied by ion-exchangeable large metal cations such as potassium and water molecules permitting reversible dehydration. The actual formula of the zeolite may vary without changing the crystalline structure. In an embodiment, the mole ratio of silicon to aluminum (Si/Al) in the zeolite may vary from about 1.0 to about 3.5.

Generally, in an aspect the first catalyst, the intermediate catalysts, and the last catalyst each comprise, independently, an inorganic support comprising a crystalline or an amorphous inorganic oxide, or combinations thereof. In addition to the first catalyst, the intermediate catalysts, and the last catalyst each comprising, independently, an inorganic support comprising or selected from a zeolite or a silica-bound zeolite, the inorganic support may comprise or be selected from any of a clay mineral, silica, alumina, silica-alumina, aluminum phosphate, a heteropolytungstate, titania, zirconia, magnesia, boria, zinc oxide, mixed oxides thereof, a silica-bound zeolite, or mixtures thereof.

According to another aspect, the inorganic support of the first catalyst, the one or more intermediate catalysts, and/or the last catalyst such as the zeolites disclosed herein, may each further comprises, independently, a binder. Any weight percentage of binder disclosed herein, for example, from about 3 wt % to about 35 wt %, or from about 5 wt % to about 30 wt % binder, based on the total weight of the first catalyst, the intermediate catalysts, and the last catalyst, independently. In this aspect, for example, the binder of each inorganic support can comprise, independently, an inorganic solid oxide, a clay, or a combination thereof, such as alumina, silica, magnesia, boria, titania, zirconia, a mixed oxide thereof, or a mixture thereof. The term "binder" is used regardless of the extent to which these oxide materials also function as supports for the Group 8 metal catalyst, in addition to the material that is bound such as zeolites. Examples of binder-support or simply, "inorganic supports," include or comprise a silica-bound or alumina-bound L-zeolite, barium ion-exchanged L-zeolite, or K/L-zeolite.

The inorganic supports of this disclosure can be independently produced by a process that comprises, in this exemplary aspect, the following steps: a) combining the L-zeolite, barium ion-exchanged L-zeolite, or K/L-zeolite with a silica or alumina sol to form a mixture, extruding the mixture to form an extrudate, b) drying, and calcining the extrudate to form a bound support; and c) washing, drying, and calcining the bound support to form the inorganic support. Therefore, the inorganic support of the first catalyst, the one or more intermediate catalysts, and/or the last catalyst can be described as each comprising, independently, at least one zeolite and at least one binder.

In aspects, the aromatization catalyst support may comprise a large pore zeolite. The term "large-pore zeolite" may be defined as a zeolite having an effective pore diameter of from about 6 Angstroms (Å) to about 15 Å; alternatively, from about 7 Å to about 9 Å. Examples of large pore crystalline zeolites are type L-zeolite (Zeolite L or LTL), X-zeolite (zeolite X), Y-zeolite (zeolite Y), omega zeolite, beta zeolite, ZSM-4, ZSM-5, ZSM-10, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, faujasite, and combinations thereof. In one aspect, the large pore zeolite may comprise an isotypic framework structure. In one embodiment, the aromatization catalyst support may comprise L-zeolite.

L-Zeolite, its x-ray diffraction pattern, its properties, and methods for its preparation are described in detail in, U.S. Pat. No. 3,216,789, the content of which is incorporated herein by reference. Additional supports are described as follows: Zeolite X is described in U.S. Pat. No. 2,882,244; mazzite is described in U.S. Pat. Nos. 4,503,023 and 4,021,447; mordenite is described in U.S. Pat. No. 4,503,023; zeolite Y is described in U.S. Pat. No. 3,130,007; and each of U.S. Pat. Nos. 3,216,789; 2,882,244; 4,503,023; 4,021,447; and 3,130,007, are hereby incorporated by reference herein to demonstrate zeolites useful for aromatization processes in this disclosure.

In an aspect, the aromatization catalyst may comprise or may be selected from a large pore L-zeolite. L-type zeolite catalysts are a sub-group of zeolitic catalysts, and typical L-type zeolites contain mole ratios of oxides in accordance with the following formula:

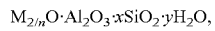

$$M_{2/n}O \cdot Al_2O_3 \cdot xSiO_2 \cdot yH_2O,$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of the cation "M", "x" may be 2 or greater; and "y" is the number of water molecules contained in the channels or interconnected voids with the zeolite.

Bound potassium L-type zeolites, or KL zeolites, have been found to work very well. The term KL zeolite as used herein refers to L-type zeolites in which the principal cation M incorporated in the zeolite may comprise potassium. A KL zeolite may be cation-exchanged or impregnated with another metal and one or more halides to produce a platinum-impregnated, halided zeolite or a KL supported Pt-halide zeolite catalyst. In one embodiment, the zeolite may comprise type L zeolite. In aspects, the aromatization catalyst may comprise a potassium L-type zeolite, hereafter referred to as KL-zeolite, which refers to L-type zeolites wherein the principal exchangeable cation M of the zeolite is potassium.

One or more Group 8-10 metals or other suitable metals such as rhenium can be added to the catalyst support to form a metallized catalyst support. The metal may be added to the catalyst support by employing a variety of known and conventional techniques, for example, ion-exchange, incipient wetness, pore fill, impregnation, vapor deposition, and the like. In embodiments, the platinum and optionally one or more halides may be added to the zeolite support by any suitable method, for example by impregnation with a solution of a platinum-containing compound and one or more halide-containing compounds.

In one aspect, the metal may be added to the catalyst support by impregnation with a metal-containing solution. The metal in the metal containing solution may comprise at least one metal from Group 8-10; alternatively, ruthenium, osmium, rhodium, iridium, palladium or platinum, or combinations thereof. In one embodiment, the metal may comprise platinum that may be added to the catalyst support via contact with a metal-containing solution containing at least one platinum-containing compound. Examples of suitable platinum-containing compounds for contact with the catalyst support include without limitation platinum compounds that form positively charged platinum complex ions in solution such as for example platinum salts such as chlorides and nitrates; platinum complexes with amines; or combinations thereof. For example, the platinum-containing compound can be any decomposable platinum-containing compound including, but not limited to, ammonium tetrachloroplatinate, chloroplatinic acid, diammineplatinum (II) nitrite, bis(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate. In one embodiment, the platinum source may comprise tetraamine platinum chloride (TAPC). The amount of platinum in the metallized catalyst support may range from about 0.1 to about 5 wt %; for example, from about 0.1 to about 3 wt %; for example, from about 0.3 to about 1.8 wt %. In a further aspect, the concentration of the Group 8-10 metal of each of the first catalyst, the intermediate catalysts, and the last catalyst can be selected independently from 0.3 wt % to 1.5 wt % relative to the weight of each respective catalyst prior to reduction.

In an aspect, the catalyst may comprise a large pore zeolite support with a platinum-containing compound and at least one halide. One or more halides may be added to the catalyst support by contact with a halide-containing compound to form a halided supported catalyst. The halides may be added into the catalyst support separately; alternatively, the halides may be added to the catalyst support at the same time. Such halides may be incorporated during addition of a metal, alternatively, the halides may be incorporated in a separate step that may be pre- or post-addition of the metal, to form a halided, metallized catalyst support. Examples of suitable halides include without limitation fluoride, chloride, bromide, iodide, or combinations thereof. Such halides may be introduced, for example, as the ammonium halide compound.

In one embodiment, the catalyst may comprise a large pore zeolite support with a platinum-containing compound and at least one ammonium halide compound. The ammonium halide compound may comprise or be selected from one or more compounds having the formula $[NR_4]X$, where X may comprise a halide and where R represents a hydrogen or a substituted or unsubstituted hydrocarbyl moiety having from 1 to about 20 carbons, and wherein each R may be the same or different, that is, selected independently. In one embodiment, R may comprise hydrogen, methyl, ethyl, propyl, butyl, or may be combinations thereof in the formula $[NR_4]X$. Examples of a suitable organic ammonium compound of the formula $[NR_4]X$ include, but are not limited to, ammonium chloride, ammonium fluoride, and tetraalkylammonium halides such as tetramethylammonium chloride (TMAC), tetramethylammonium fluoride (TMAF), tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or combinations thereof.

In an aspect, the ammonium halide compound may comprise at least one acid halide and at least one ammonium hydroxide represented by the formula $[NR'_4]OH$, where R' may comprise or be selected from hydrogen or a substituted or unsubstituted hydrocarbyl moiety having from 1 to about 20 carbon atoms, wherein each R' may be the same or different, that is, selected independently. In one embodiment, R' may comprise methyl, ethyl, propyl, butyl, or combinations thereof. Examples of a suitable ammonium hydroxide represented by the formula $[NR'_4]OH$ may include ammonium hydroxide, tetraalkylammonium hydroxides such as tetramethylammonium hydroxide, tetraethylammonium hydroxide, tetrapropylammonium hydroxide, tetrabutylammonium hydroxide, and combinations thereof. Examples of suitable acid halides may include HCl, HF, HBr, HI, or combinations thereof.

In another aspect, the ammonium halide compound may comprise (a) a compound represented by the formula $[NR_4]X$, wherein X may comprise a halide and where R represents a hydrogen or a substituted or unsubstituted hydrocarbyl group having from 1 to about 20 carbon atoms, wherein each R may be the same or different, and (b) at least one acid halide and at least one ammonium hydroxide represented by the formula $[NR'_4]OH$, where R' may comprise hydrogen or a substituted or unsubstituted hydrocarbyl group having from 1 to about 20 carbon atoms, and wherein each R' may be the same or different.

The halide-containing compound may further comprise an ammonium halide such as ammonium chloride, ammonium fluoride, or both in various combinations with the ammonium halide compounds described previously. More specifically, ammonium chloride, ammonium fluoride, or both may be used with (a) as described previously, a compound represented by the formula $[NR_4]X$, where X may comprise a halide and where R represents a hydrogen or a substituted or unsubstituted hydrocarbyl group having from 1 to about 20 carbons wherein each R may be the same or different and/or (b) as described previously, at least one acid halide and at least one organic ammonium hydroxide represented by the formula $[NR'_4]OH$, where R' may comprise a hydrogen or a substituted or unsubstituted hydrocarbyl group having from 1 to about 20 carbon atoms wherein each R' may be the same or different. For example, a first fluoride- or chloride-containing compound can be introduced as a tetraalkylammonium halide with a second fluoride- or chloride-containing compound introduced as an ammonium halide. In certain aspects, a tetraalkylammonium chloride may be used along with ammonium fluoride. In another aspect, ammonium chloride may be used along with ammonium fluoride.

Generally, and in one aspect, the aromatization catalyst in any particular catalyst bed may comprise a metallized, halided supported catalyst in which the total amount of halide in the catalyst is selected independently of the total amount of halide in any other catalyst in any other catalyst bed, and can range from about 0.05 wt % to about 6.0 wt % of the total metallized, halided supported catalyst. Alternatively, the total amount of halide in any catalyst can range, independently, from about 0.1 wt % to about 5.0 wt %, from about 0.3 wt % to about 4.0 wt %, or from about 0.5 wt % to about 3.5 wt % of the catalyst. In another aspect, any halided supported catalyst may comprise chloride present in an amount of from about 0.05 wt % to about 5 wt %; for example, from about 0.1 wt % to about 3 wt %; for example, from about 0.3 wt % to about 1.8 wt % of the catalyst. Alternatively, the total amount of halide in the catalyst can be independently selected from about 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.2 wt %, 1.4 wt %, 1.6 wt %, 1.8 wt %, 2.0 wt %, 2.2 wt %, 2.4 wt %, 2.6 wt %, 2.8 wt %, 3.0 wt %, 3.2 wt %, 3.4 wt %, 3.6 wt %, 3.8 wt %, 4.0 wt %, 4.2 wt %, 4.4 wt %, 4.6 wt %, 4.8 wt %, 5.0 wt %, 5.2 wt %, 5.4 wt %, 5.6 wt %, 5.8 wt %, or 6.0 wt % of the catalyst.

The process for reforming hydrocarbons or a catalytic hydrocarbon reforming system according to this disclosure can further comprising one or more intermediate catalysts in the one or more intermediate catalyst beds, wherein the fluoride concentration (wt %) in one or more intermediate catalysts is greater than or equal to the fluoride concentration of the last catalyst prior to reduction. In another aspect, the process for reforming hydrocarbons or a catalytic hydrocarbon reforming system according to the disclosure can further comprise one or more intermediate catalysts in the one or more intermediate catalyst beds, wherein the fluoride concentration (wt %) of one or more intermediate catalysts at startup can be less than or equal to the fluoride concentration of the first catalyst prior to reduction and greater than or equal to the fluoride concentration of the last catalyst prior to reduction. Alternatively, the fluoride concentration (wt %) of one or more intermediate catalysts at startup can be greater than or equal to the fluoride concentration of the first catalyst prior to reduction and greater than or equal to the fluoride concentration of the last catalyst prior to reduction. Non-limiting examples of the weight percentages are set out below.

In one aspect, the aromatization catalyst in any particular catalyst bed may comprise a metallized, halided supported catalyst in which the total amount of fluoride in the catalyst is selected independently of the total amount of fluoride in any other catalyst in any other catalyst bed, and can range from about 0.05 wt % to about 6.0 wt % of the total metallized, halided supported catalyst. Alternatively, the total amount of fluoride in any catalyst can range, independently, from about 0.1 wt % to about 5.0 wt %, from about 0.3 wt % to about 4.0 wt %, or from about 0.5 wt % to about 3.5 wt % of the catalyst. In another aspect, any halided supported catalyst may comprise fluoride present in an amount of from about 0.05 wt % to about 5 wt %; for example, from about 0.1 wt % to about 3 wt %; for example, from about 0.3 wt % to about 1.8 wt % of the catalyst. Alternatively, the total amount of fluoride in the catalyst can be independently selected from about 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.2 wt %, 1.4 wt %, 1.6 wt %, 1.8 wt %, 2.0 wt %, 2.2 wt %, 2.4 wt %, 2.6 wt %, 2.8 wt %, 3.0 wt %, 3.2 wt %, 3.4 wt %, 3.6 wt %, 3.8 wt %, 4.0 wt %, 4.2 wt %, 4.4 wt %, 4.6 wt %, 4.8 wt %, 5.0 wt %, 5.2 wt %, 5.4 wt %, 5.6 wt %, 5.8 wt %, or 6.0 wt % of the catalyst.

The process for reforming hydrocarbons or a catalytic hydrocarbon reforming system according to this disclosure, in an aspect, can comprise a fluoride concentration (wt %) in the first catalyst, the intermediate catalysts, and the last catalyst can independently be selected from a concentration up to 5 wt % or up to 6 wt %. In another aspect, the fluoride concentration (wt %) of the first catalyst is from 10% to 50% greater than the fluoride concentration (wt %) of the last catalyst. In still another aspect, the fluoride concentration (wt %) of the first catalyst is from 50% to 90% greater than the fluoride concentration (wt %) of the last catalyst.

Any one or more of the first catalyst, the intermediate catalysts, and/or the last catalyst may further comprise chloride. Therefore in an aspect, the aromatization catalyst in any particular catalyst bed may comprise a metallized, halided supported catalyst in which the total amount of chloride in the catalyst is selected independently of the total amount of chloride in any other catalyst in any other catalyst bed. In this aspect, the total amount of chloride in a catalyst can be selected independently and can range from about 0.05 wt % to about 6.0 wt % of the total metallized, halided supported catalyst. Alternatively, the total amount of chloride in any catalyst can range, independently, from about 0.1 wt % to about 5.0 wt %, from about 0.3 wt % to about 4.0 wt %, or from about 0.5 wt % to about 3.5 wt % of the catalyst. In another aspect, any halided supported catalyst may comprise chloride present in an amount of from about 0.05 wt % to about 5 wt %; for example, from about 0.1 wt % to about 3 wt %; for example, from about 0.3 wt % to about 1.8 wt % of the catalyst. Alternatively, the total amount of chloride in the catalyst can be independently selected from about 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.2 wt %, 1.4 wt %, 1.6 wt %, 1.8 wt %, 2.0 wt %, 2.2 wt %, 2.4 wt %, 2.6 wt %, 2.8 wt %, 3.0 wt %, 3.2 wt %, 3.4 wt %, 3.6 wt %, 3.8 wt %, 4.0 wt %, 4.2 wt %, 4.4 wt %, 4.6 wt %, 4.8 wt %, 5.0 wt %, 5.2 wt %, 5.4 wt %, 5.6 wt %, 5.8 wt %, or 6.0 wt % of the catalyst.

In one aspect, the halide supported catalyst may comprise both chloride and fluoride, which may be present in a Cl:F weight ratio of from about 1:10 to about 10:1; for example, from about 1:5 to about 5:1; for example, from about 1:2 to about 2:1. In a further aspect, the halide supported catalyst may comprise both chloride and fluoride, which may be present in a Cl:F molar ratio of from about 1:10 to about 10:1; for example, from about 1:5 to about 5:1; for example, from about 1:2 to about 2:1.

Reduction of the catalyst generally reduces the halide content of the catalyst. For example, the first catalyst, any intermediate catalysts, and the last catalyst can comprise chloride in a concentration of at least or about 0.5 wt % relative to the weight of the first catalyst prior to reduction, and/or the last catalyst can further comprise chloride in a concentration of at least or about 0.5 wt % relative to the weight of the last catalyst prior to reduction. Further, any one or more of the first catalyst, the intermediate catalysts, and/or the last catalyst can comprise chloride independently selected from a concentration up to about 6.0 wt % prior to reduction. In further aspects, any one or more of the first catalyst, the intermediate catalysts, and/or the last catalyst can comprise chloride in a concentration of from 0.5 wt % to 5 wt % relative to the weight of the respective first catalyst, intermediate catalysts, and/or last catalyst prior to reduction. Any one or more of the first catalyst, the intermediate catalyst(s), and/or the last catalyst also may comprise a combined concentration of fluoride and chloride of up to 5 wt % prior to reduction.

One aspect of the disclosure provides processes for reforming hydrocarbons by using a series of adiabatic reactors and catalysts, in which the catalyst(s) in at least one front or upstream catalyst bed or reactor can include a higher fluoride content (concentration) that the catalysts in one or more downstream catalyst beds or reactors. It has been unexpectedly discovered that by using a higher weight percent of fluoride in at least one front or upstream catalyst bed or reactor as compared to one or more downstream catalyst beds or reactors, the useful life of the catalyst system may be extended by maintaining selectivity for longer than would be possible without the high halide upstream catalyst(s).

In the process for reforming hydrocarbons and the catalytic hydrocarbon reforming system disclosed herein, the reforming process it typically carried out in a series of more than one adiabatic reactor. Typically, this disclosure describes a first (furthest upstream) catalyst bed, one or more intermediate catalyst beds, and a last or final (furthest downstream) catalyst bed, which can be located each in different reactors. Typically, there can be from 1 to about 6 intermediate catalyst beds comprising from 1 to 6 intermediate catalysts, for example, reactor systems that include 4 or 5 intermediate catalyst beds work well.

In another aspect, the fluoride content (weight percent, wt %) of each catalyst bed can be selected independently from the fluoride content of any other catalyst bed at startup, such that the fluoride concentration of any or all of the first catalyst bed and the one or more intermediate catalyst beds is greater than the fluoride concentration of the last catalyst bed prior to reduction.

In another aspect, 1, 2, 3, 4 or more upstream catalyst beds can have a fluoride content (weight percent, wt %) selected independently from the fluoride content of any other catalyst bed at startup, such that the fluoride concentration of any or all of these upstream catalyst beds can be the same or different, and wherein the one or more of the first and/or intermediate catalysts in the respective catalyst beds has a greater fluoride concentration than of the last catalyst in the last catalyst bed, prior to reduction.

In a further aspect, the fluoride content (weight percent, wt %) of any two adjacent catalyst beds can be selected independently at startup, such that the fluoride concentration of the upstream catalyst bed of the two has a greater fluoride concentration than the downstream catalyst bed, prior to reduction.

For example, in a series of 6 reactors, each with its own catalyst bed, the most upstream reactors designated 1, 2, and 3 (reactor 1 is the most upstream, initial reactor) can have a catalyst with a fluoride content (for example, about 1.5 wt %) prior to reduction, whereas the most downstream reactors 4, 5 and 6 (reactor 6 is the most downstream and final reactor) can have a catalyst with a fluoride content (for example, about 1.0 wt %), prior to reduction. Alternatively, reactors 1, 2, 3, and 4 can have a higher fluoride content (for example, about 1.5 wt %) prior to reduction, whereas the most downstream reactors 5 and 6 can have a catalyst with a lower fluoride content (for example, about 1.0 wt %), prior to reduction. Alternatively, still, reactors designated 1 and 2 can have a catalyst with a higher fluoride content (for example, about 1.5 wt %) prior to reduction, whereas the most downstream reactors 3, 4, 5 and 6 can have a catalyst with a lower fluoride content (for example, about 1.0 wt %), prior to reduction. Further, reactor 1 can have a catalyst with a higher fluoride content (for example, about 1.5 wt %) prior to reduction, whereas the downstream reactors 2, 3, 4, 5 and 6 can have a catalyst with a lower fluoride content (for example, about 1.0 wt %), prior to reduction. The "higher" fluoride content as recited in these aspects or embodiments can be, for example, selected independently from any of the fluoride concentrations disclosed herein, that is greater than the "lower" fluoride content disclosed herein. For example, the "higher" fluoride content can be about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, or about 2.0 wt %, and the "lower" fluoride content can be any weight percentage lower than the selected higher fluoride content.

Examples 1 and 2 set out exemplary methods of preparing a halided platinum L-zeolite catalyst, which can be used generally for preparing a catalyst with known fluoride content for use in any individual catalyst bed. Example 3 sets out an exemplary reactor system using a series of 6 reactors, each with its own catalyst bed, the most upstream reactors designated 1 and the most downstream designated 6, and exemplary fluoride weight percentages according to this disclosure.

In an aspect, similar selections for the higher fluoride content versus the downstream lower fluoride content as set out immediately above are possible with less than 6 reactors total or more than 6 reactors total. For example, the process or system can include from 1 to 6 or more (e.g. 7, 8, or 9) intermediate catalyst beds comprising from 1 to 6 or more (e.g. 7, 8, or 9) intermediate catalysts, respectively, and the upstream "higher" fluoride content can occur in any or all of the first catalyst bed and the intermediate catalyst beds, and the "lower" fluoride content can occur in the last catalyst bed and any intermediate catalyst beds that are downstream of the higher fluoride catalyst beds, wherein the lower fluoride content can be any weight percentage lower than the selected higher fluoride content.

Conventional catalysts for use in the process as described generally can see a decline in catalytic activity that occurs as the catalyst is used under commercial reaction conditions. A catalyst is generally considered spent when it has reached an unacceptable level in one or more of, activity, conversion, selectivity, yield or other operating parameter. Using the processes and systems of this disclosure, it has been found unexpectedly that the selectivity of the system of aromatization catalysts in the series of catalyst beds can be sustained for longer use than when the fluoride content of all of the aromatization catalysts in the series of catalyst beds have the same fluoride content. Regenerable catalysts are appropriate for use in the processes as described, and the catalysts can be subjected to any art recognized regeneration chemistry. For example, transition metal catalysts are often regenerated by contacting the spent catalyst with a halogen-containing stream, e.g., chlorine or fluorine and then decoking the catalyst in an oxygen stream, in which the selected upstream catalyst have a higher halide such as fluoride content than the downstream catalysts as set out herein.

The aromatization reactions may occur under process conditions that thermodynamically favor the dehydrocyclization (aromatization) reaction and limit the undesirable hydrocracking reactions. Operating ranges for a typical catalytic aromatization process, such as an aromatization process as disclosed herein, may include reactor inlet temperatures between about 370° C. and about 570° C., for example between about 430° C. and about 550° C.; a system pressure between about 10 pounds per square inch gauge (psig) and about 300 psig, for example from about 15 psig to about 100 psig; a hydrogen rate sufficient to yield a hydrogen to hydrocarbon mole ratio for the feed to the reforming reactor zone between about 0.1 and about 20, for example from about 3 to about 10, for example from about 1.5 to about 6; and, a liquid hourly space velocity for the hydrocarbon feed over the aromatization catalyst of between about 0.1 and about 10.

The Reactor System and Process

Exemplary catalytic reactor systems, reactor vessels, and processes that can be used for the production of aromatic hydrocarbons from a naphtha feedstock according to this disclosure are described in, for example, U.S. Pat. Nos. 6,548,030; 6,900,365; 7,932,425; 8,912,108; 9,421,530; and 9,718,042; which are incorporated herein by reference in their entireties. In an aspect, one type of catalytic reactor system comprises six or seven catalytic reforming reactors in series, each of which has a reactor feed and a reactor effluent. Aromatization reactions are highly endothermic, utilizing more heat than they produce, therefore each reactor feed is heated by furnaces.

FIG. 1 illustrates one process diagram of an exemplary catalytic reactor system 100 suitable for use in an aromatization system and process as described herein. As shown in FIG. 1, the catalytic reactor system 100 comprises four aromatization reactors in series: reactors 10, 20, 30, and 40. In one aspect, the catalytic reactor system 100 may comprise any suitable number and configuration of aromatization reactors, for example one, two, three, five, six, seven, or more reactors in series or in parallel. As aromatization reactions are highly endothermic, large temperature drops occur across the reactors 10, 20, 30, and 40. Therefore, each reactor 10, 20, 30, and 40 in the series may comprise a corresponding furnace 11, 21, 31, and 41, respectively, for reheating components back to a desired temperature for maintaining a desired reaction rate. Alternatively, one or more reactor 10, 20, 30, and 40 may share a common furnace where practical. The reactors 10, 20, 30, and 40, furnaces 11, 21, 31, and 41, and associated piping may be referred to herein as the reaction zone.

In FIG. 1, the naphtha or hydrocarbon feed generally 101 is combined with recycle stream 119 to form combined feed stream 102, which is fed into purification process 80. The purification process 80 employs known processes to purify the hydrocarbon feed, which may include fractionation and/or treating the hydrocarbon feed. As used herein, the term "Fractionation" includes removing heavy (e.g., $C_9$+) hydrocarbons and/or light (e.g., $C_5^-$) hydrocarbons. As used herein, the terms "treating" and "removing" refer interchangeably to removing impurities, such as oxygenates, sulfur, and/or metals, from the hydrocarbon feed. The resulting purified feed 103 may be combined with a dry hydrogen recycle 116 to produce hydrogen rich purified feed 104, which may then be combined with an oxygenate and/or nitrogenate 105 to produce a reactor feed stream 106. If desired, oxygenate and/or nitrogenate may be fed to the reactor system 100 at one or more locations in addition to stream 105 or as an alternative to stream 105, as will be described in more detail herein.

The reactor feed stream 106 is pre-heated in a first furnace 11, which heats the hydrocarbons to a desired temperature, thereby producing a first reactor feed 107. First reactor feed 107 is fed into reactor 10, where the hydrocarbons are contacted with an aromatization catalyst under suitable reaction conditions (e.g., temperature and pressure) that aromatize one or more components in the feed, thereby increasing the aromatics content thereof. A first reactor effluent 108 comprising aromatics, unreacted feed, and other hydrocarbon compounds or byproducts are recovered from the first reactor 10.

The first reactor effluent 108 is then pre-heated in the second furnace 21, which heats the hydrocarbons to a desired temperature, thereby producing a second reactor feed 109. Second reactor feed 109 is then fed into reactor 20, where the hydrocarbons are contacted with an aromatization catalyst under suitable reaction conditions for aromatizing one or more components in the feed to increase the aromatics content thereof. A second reactor effluent 110 comprising aromatics, unreacted feed, and other hydrocarbon compounds or byproducts are recovered from the second reactor 20.

The second reactor effluent 110 is then pre-heated in the third furnace 31, which heats the hydrocarbons to a desired temperature, thereby producing a third reactor feed 111. Third reactor feed 111 is then fed into reactor 30, where the hydrocarbons are contacted with an aromatization catalyst under suitable reaction conditions for aromatizing one or more components in the feed to increase the aromatics content thereof. A third reactor effluent 112 comprising aromatics, unreacted feed, and other hydrocarbon compounds or byproducts is recovered from the third reactor 30.

The third reactor effluent 112 is then pre-heated in the fourth furnace 41, which heats the hydrocarbons to a desired temperature, thereby producing a fourth reactor feed 113. Fourth reactor feed 113 is then fed into reactor 40, where the hydrocarbons are contacted with an aromatization catalyst under suitable reaction conditions for aromatizing one or more components in the feed to increase the aromatics content thereof. Additional aromatization reactors can be provided downstream of the fourth reactor if desired (not shown in FIG. 1). A fourth reactor effluent 114 comprising aromatics, unreacted feed, and other hydrocarbon compounds or byproducts is recovered from the fourth reactor 40.

The fourth reactor effluent 114 is then fed into a hydrogen separation process 50 that uses a number of known processes to separate a hydrogen recycle 115 from a reformate 117. The reformate 117 comprises the aromatization reaction products from reactors 10, 20, 30, and 40 (e.g., aromatic and non-aromatic compounds) in addition to any unreacted feed and other hydrocarbon compounds or byproducts. The hydrogen recycle 115 may be dried in a dryer 60, thereby forming dry hydrogen recycle 116, which may then be recycled into the purified feed 103. The reformate 117 goes to a purification-extraction process 70, which separates the raffinate recycle 119 and reactor byproducts (not shown) from the aromatics 118.

The hydrogen separation processes 50 and the purification-extraction processes 70 are well known in the art and are described in numerous patents, including: U.S. Pat. No. 5,401,386 to Morrison et al. entitled "Reforming Process for Producing High-Purity Benzene"; U.S. Pat. No. 5,877,367 to Witte entitled "Dehydrocyclization Process with Downstream Dimethylbenzene Removal"; and U.S. Pat. No. 6,004,452 to Ash et al. entitled "Process for Converting Hydrocarbon Feed to High Purity Benzene and High Purity Paraxylene"; each of which is incorporated herein by reference as if reproduced in its entirety.

The raffinate recycle 119 is then recycled into the feed 101 and the aromatics 118 are sold or otherwise used as desired. For the sake of simplicity, FIG. 1 does not illustrate the byproduct streams that are removed from the catalytic reactor system 100 at various points throughout the system. However, persons of ordinary skill in the art are aware of the composition and location of such byproduct streams. Also, while FIG. 1 shows an oxygenate and/or nitrogenate 105 being added to hydrogen rich purified feed 104, persons of ordinary skill in the art will appreciate that the oxygenate and/or nitrogenate may be added to any of process streams 101, 102, 103, 104, 106, 107, 108, 109, 110, 111, 112, 113, 114, 115, 116, 117, 119, or various combinations thereof.

In various aspects, the catalytic reactor system described herein may comprise a fixed catalyst bed system, a moving catalyst bed system, a fluidized catalyst bed system, or combinations thereof. Such reactor systems may be batch or continuous. In an aspect, the catalytic reactor system can be a fixed bed system comprising one or more fixed bed reactors. In a fixed bed system, the feed may be preheated in furnace tubes and passed into at least one reactor that contains a fixed bed of the catalyst. The flow of the feed can be upward, downward, or radially through the reactor. In an aspect, the catalytic reactor system described herein may be operated as an adiabatic catalytic reactor system or an isothermal catalytic reactor system. As used herein, the term "catalytic reactor" and "reactor" refer interchangeably to the reactor vessel, reactor internals, and associated processing equipment, including but not limited to the catalyst, inert packing materials, scallops, flow distributors, center pipes, reactor ports, catalyst transfer and distribution system, furnaces and other heating devices, heat transfer equipment, and piping.

A further aspect of the process for reforming hydrocarbons according to this disclosure provides that the conditions for aromatizing at least a portion of the naphtha or aliphatic hydrocarbons can comprise catalyst startup at a gas flow rate comprising a GHSV of between 600 and 1500 $hr^{-1}$ and a heat-up rate of between 10° F./hr and 25° F./hr during catalyst reduction above about 500° F., wherein the first catalyst, the intermediate catalysts, and/or the last catalyst comprise a fluorided-chlorided zeolite platinum catalyst.

In some aspects, the catalytic reactor system may be operated during catalyst startup at a gas flow rate comprising a GHSV of between about 400 and about 2000 $hr^{-1}$, for example 400 $hr^{-1}$, about 500 $hr^{-1}$, about 600 $hr^{-1}$, about 700 $hr^{-1}$, about 800 $hr^{-1}$, about 900 $hr^{-1}$, about 1000 $hr^{-1}$, about 1100 $hr^{-1}$, about 1200 $hr^{-1}$, about 1300 $hr^{-1}$, about 1400 $hr^{-1}$, about 1500 $hr^{-1}$, about 1600 $hr^{-1}$, about 1700 $hr^{-1}$, about 1800 $hr^{-1}$, about 1900 $hr^{-1}$, or about 2000 $hr^{-1}$. In other aspects the catalytic reactor system may be operated during catalyst startup at a heat-up rate of between 5° F./hr and 50° F./hr during catalyst reduction above about 500° F., for example about 5° F./hr, about 10° F./hr, about 15° F./hr, about 20° F./hr, about 25° F./hr, about 30° F./hr, about 35° F./hr, about 40° F./hr, about 45° F./hr, or about 50° F./hr.

For example, in certain embodiments in which the catalyst comprises a halided zeolite catalyst, the catalytic reactor system may be operated during catalyst startup at a gas flow rate comprising a GHSV of between about 400 and about 2000 hr$^{-1}$, for example 400 hr$^{-1}$, about 500 hr$^{-1}$, about 600 hr$^{-1}$, about 700 hr$^{-1}$, about 800 hr$^{-1}$, about 900 hr$^{-1}$, about 1000 hr$^{-1}$, about 1100 hr$^{-1}$, about 1200 hr$^{-1}$, about 1300 hr$^{-1}$, about 1400 hr$^{-1}$, about 1500 hr$^{-1}$, about 1600 hr$^{-1}$, about 1700 hr$^{-1}$, about 1800 hr$^{-1}$, about 1900 hr$^{-1}$, or about 2000 hr$^{-1}$ and at a heat-up rate of between 5° F./hr and 50° F./hr during catalyst reduction above about 500° F., for example about 5° F./hr, about 10° F./hr, about 15° F./hr, about 20° F./hr, about 25° F./hr, about 30° F./hr, about 35° F./hr, about 40° F./hr, about 45° F./hr, or about 50° F./hr.

In an aspect wherein the catalyst comprises a fluorided zeolite platinum catalyst, the catalytic reactor system may be operated during catalyst startup at a gas flow rate comprising a GHSV of between about 600 and about 1500 hr$^{-1}$, for example about 600 hr$^{-1}$, about 700 hr$^{-1}$, about 800 hr$^{-1}$, about 900 hr$^{-1}$, about 1000 hr$^{-1}$, about 1100 hr$^{-1}$, about 1200 hr$^{-1}$, about 1300 hr$^{-1}$, about 1400 hr$^{-1}$, or about 1500 hr$^{-1}$, and at a heat-up rate of between 10° F./hr and 30° F./hr during catalyst reduction above about 500° F., for example about 10° F./hr, about 15° F./hr, about 20° F./hr, about 25° F./hr, or about 30° F./hr.

In some embodiments wherein the catalyst comprises a fluorided-chlorided zeolite platinum catalyst, the catalytic reactor system 100 may be operated during catalyst startup at a gas flow rate comprising a GHSV of between about 600 and about 1500 hr$^{-1}$, for example about 600 hr$^{-1}$, about 700 hr$^{-1}$, about 800 hr$^{-1}$, about 900 hr$^{-1}$, about 1000 hr$^{-1}$, about 1100 hr$^{-1}$, about 1200 hr$^{-1}$, about 1300 hr$^{-1}$, about 1400 hr$^{-1}$, or about 1500 hr$^{-1}$ and at a heat-up rate of between 10° F./hr and 25° F./hr during catalyst reduction above about 500° F., for example about 10° F./hr, about 15° F./hr, about 20° F./hr, or about 25° F./hr.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Example 1

Preparation of a Platinum-Impregnated KL-Zeolite Catalyst

A platinum-impregnated KL-zeolite catalyst containing 1.0 wt % platinum is prepared in the following manner. An impregnating mixture of 0.10 gram (g) tetraamine platinum chloride (TAPC), 0.45 g, tetramethylammonium fluoride (TMAF), 0.10 g tetramethylammonium chloride (TMAC) and 2.50 g water is formed and added to 5.0 g of a silica bound KL-zeolite extrudates that have been calcined for 2 hours at 538° C. The mixture is impregnated into the KL-zeolite and then allowed to stand for 20 hours at 95° C. The impregnated KL-zeolite is dried in a vacuum for 2 hours at 170° C. (ramp rate is 0.5° C./min) and then calcined at 300° C. for another 2 hours (ramp rate is 0.25° C./min). The resulting catalyst contains 1.07 wt % Pt, 1.02 wt % Cl and 1.0 wt % F.

Example 2

Alternative Preparation of a Platinum-Impregnated KL-Zeolite Catalyst

A platinum-impregnated KL-zeolite catalyst containing 0.5 wt % platinum is prepared in the following manner. An impregnating mixture of 0.05 g TAPC, 0.10 g NH$_4$F, and 0.05 g NH$_4$Cl is formed and added to a container containing 5.0 g of a silica bound KL-zeolite predried for 2 hours at 538° C. The mixture is impregnated into the KL-zeolite and then allowed to stand for 20 hours at 95° C. The impregnated KL-zeolite is dried in a vacuum for 2 hours at 170° C. (ramp rate is 0.5° C./min) and then calcined at 300° C. for another 2 hours (ramp rate is 0.25° C./min). The resulting catalyst contains 0.55 wt % Pt, 0.5 wt % Cl and 1.0 wt % F.

Example 3

Alternative Preparation of a Halided Platinum L-Zeolite Catalyst

A halided platinum L-zeolite catalyst was prepared in a manner similar to Example 4 of EP 498,182A or U.S. Pat. No. 5,354,933. To 100 parts by weight of K L-type zeolite (Tosoh, Ltd., Japan), 20 parts by weight of a silica binder (SI-350 silica sol, sold by Cat. & Chem. Ind. Inc. [CCIC], Japan) were added with mixing. This mixture was kneaded and molded, and then air-calcined at 500° C. (932° F.) for 2 hours (hr) to produce a molded calcined silica-bound L-zeolite extrudate. An impregnation liquid comprising 0.166 g of ammonium fluoride, 0.075 g of ammonium chloride, 0.171 g (grams) of platinum tetraammine chloride, and 4.8 g of ion exchanged water was prepared. This liquid was slowly dropped into 10 g of the molded L-zeolite with stirring. The resulting solid was vacuum dried and then treated at 300° C. (572° F.) for 3 hr in dry air. The resulting catalyst was analyzed and contained about 0.7 wt % F and 0.7 wt % Cl. The sodium content was about 0.56 wt %, as measured by atomic adsorption spectroscopy.

Example 4

Preparation of a High Fluoride Platinum L-Zeolite Catalyst

A halided platinum L-zeolite catalyst having a higher fluoride content as compared to the catalyst of Examples 1-3 is prepared by following the general procedure of Example 1, with the exception of using a higher relative amount of fluoride source compound such as ammonium fluoride or tetramethylammonium fluoride, relative to the weights of the additional components. With this procedure, halided platinum L-zeolite catalysts having a fluoride content of from about 0.8 wt % and higher, for example, up to about 2.0 wt %, can be prepared.

Example 5

Weight Percentage of Fluoride in a Series of Aromatization Reactors

The following Table sets out exemplary aromatization reactor configurations, with a first and last reactor, and in the examples shown, four intermediate reactors, with examples of the weight percentage of fluoride in each catalyst bed. Examples are shown in which each catalyst bed is in a separate reactor, and some examples in which two catalyst beds are in a single reactor. Catalyst Bed 1 is the first or most upstream bed, while Catalyst Bed 6 is the last or most downstream catalyst bed, with Beds 2-6 in sequence constituting the intermediate beds. The procedures of Examples 1 and 2 can be used in the preparation of these catalysts.

TABLE 1

Exemplary aspects of the processes and systems of this disclosure, illustrating embodiments of fluoride concentration for a series of aromatization reactors.

| | Weight % F (before reduction) | | | | | |
|---|---|---|---|---|---|---|
| Example Number | First Catalyst Bed 1 | Catalyst Bed 2 | Catalyst Bed 3 | Catalyst Bed 4 | Catalyst Bed 5 | Last Catalyst Bed 6 |
| 5A | 1.5 | 1.0 | 1.0 | 1.0 | 1.0 | 1.0 |
| 5B | 1.5 | 1.5 | 1.0 | 1.0 | 1.0 | 1.0 |
| 5C | 1.5 | 1.5 | 1.5 | 1.0 | 1.0 | 1.0 |
| 5D | 1.5 | 1.5 | 1.5 | 1.5 | 1.0 | 1.0 |
| 5E | 1.5 | 1.5 | 1.5 | 1.5 | 1.5 | 1.0 |
| 5F | 1.7 | 1.5 | 1.5 | 1.0 | 1.0 | 1.0 |
| 5G | 1.7 | 1.7 | 1.5 | 1.0 | 1.0 | 1.0 |
| 5H | 1.9 | 1.7 | 1.7 | 1.5 | 0.8 | 0.8 |
| 5I | 1.9 | 1.7 | 1.7 | 1.7 | 1.0 | 1.0 |
| 5J | 1.5 | 1.4 | 1.3 | 1.2 | 1.1 | 1.0 |
| 5K | 1.5 | 1.5 | 1.7 | 1.0 | 1.0 | 1.0 |
| 5L | 2.0 | 1.9 | 1.8 | 1.7 | 0.7 | 0.6 |
| 5M | 2.1 | 2.0 | 1.5 | 1.0 | 1.0 | 0.8 |
| 5N | 1.5 | 1.5 | 1.5 | 0.8 | 0.8 | 0.8 |
| 5O | 1.5 | 1.5 | 1.5 | 2.0 | 1.0 | 1.0 |
| 5P | 1.5 | 1.5 | 2.0 | 1.0 | 1.0 | 0.8 |
| 5Q | 1.5 | 1.5 | 1.9 | 1.9 | 1.0 | 0.8 |

Example 6

Split Bed Catalyst Loading with Higher Halide Loading in Upstream Beds

This example demonstrates that loading the top portion, for example the top half, of a catalyst bed with a high halide catalyst will increase the overall run length through the evolving halides interacting with the catalyst downstream. Thus, upon loading a fixed bed reactor with the top half of the bed comprising of a high halide catalyst, either fluorine or chloride, followed by a reduction step, it was observed that the performance of the catalyst in the bottom half of the catalyst bed was improved.

Figure 2A:
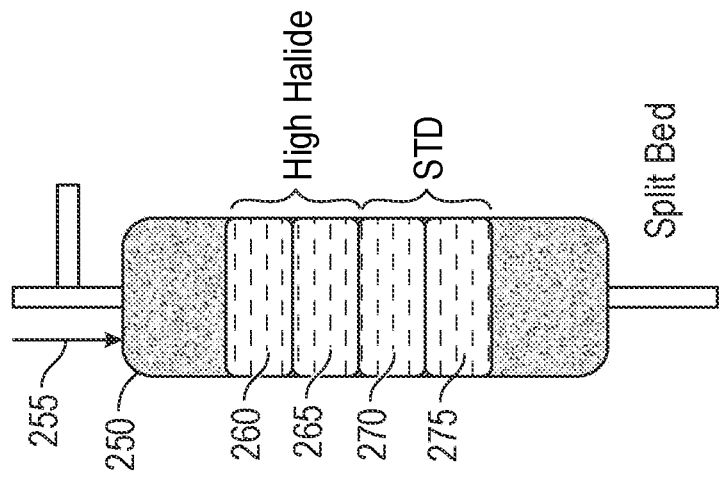
FIG. 2A illustrates an embodiment of this disclosure, showing a "Baseline" fixed bed reactor with a standard (STD) aromatization catalyst in both the top half and the bottom half of the fixed bed reactor, the performance of which is compared with the high halide embodiment in FIG. 2B.
Figure 2B:
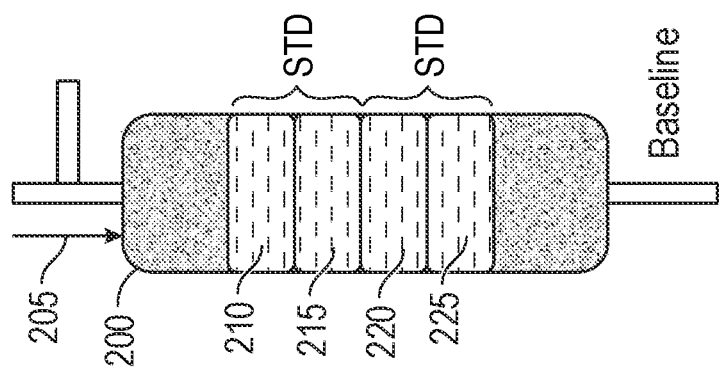
FIG. 2B illustrates an embodiment of this disclosure, showing a "Split Bed" fixed bed reactor with a high halide catalyst with a high chloride concentration in the top half of the fixed bed and a standard (STD) aromatization catalyst arrangement in the bottom half of the fixed bed, referred to as a split bed arrangement, which is compared with standard (STD) aromatization catalyst embodiment in FIG. 2A.

FIG. 2A illustrates a fixed bed "Baseline" reactor 200 with a standard (STD) aromatization catalyst arrangement, namely the Aromax® II Catalyst, in both the top half and the bottom half of the fixed bed reactor, with the direction of fluid flow 205 and bed sections 210, 215, 220, and 225 shown from an upstream to a downstream direction. FIG. 2B illustrates a fixed bed test reactor 255 with a high chloride catalyst in the (upstream) top half and a standard (STD) aromatization Aromax® II Catalyst arrangement in the (downstream) bottom half of the fixed bed, referred to as a "Split Bed" arrangement, with the direction of fluid flow 255 and bed sections 260, 265, 270, and 275 shown from an upstream to a downstream direction. These catalysts were reduced with hydrogen in the process unit reactors, removed, crushed into a 20/40 mesh, and run in the screening unit.

The bottom half portion (only) of the FIG. 2A fixed catalyst bed which contain bed sections 220 and 225, and the bottom half portion (only) of the FIG. 2B fixed catalyst bed which contain bed sections 270 and 255, were tested for activity and selectivity. The standard catalyst that was below the high chloride catalyst in FIG. 2B (bed sections 270 and 255) had better activity as indicated by the lower run temperature and was more selective than the standard catalyst from the bottom portion of the bed from the baseline configuration of FIG. 2A (bed sections 220 and 225).

Figure 3:
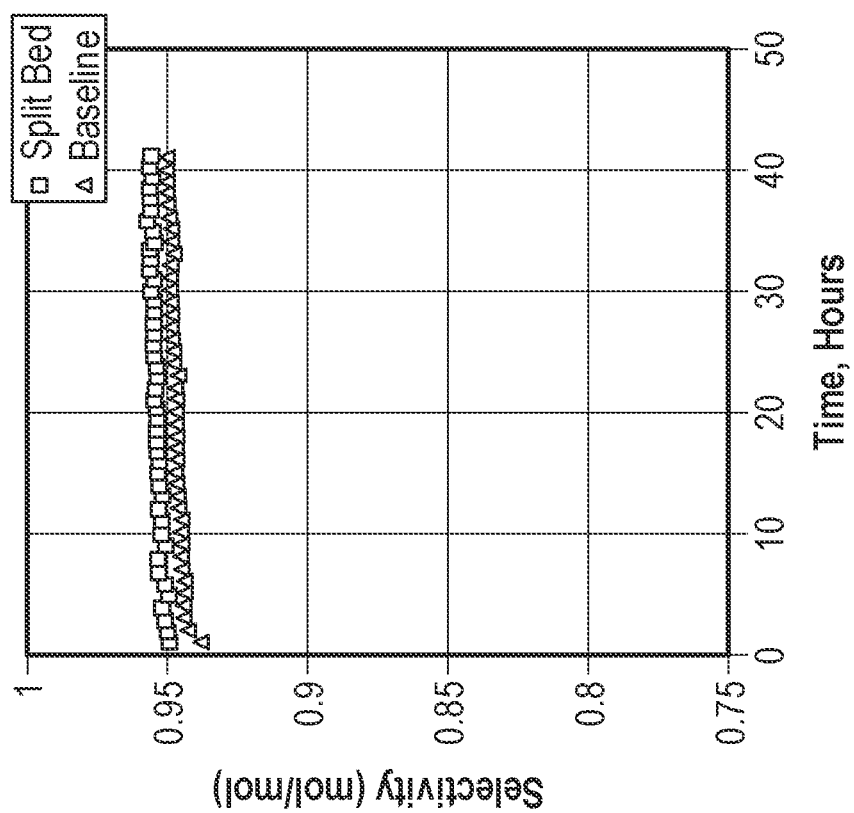
FIG. 3 illustrates a plot of the adjusted catalyst temperature (° F.) versus run time (hours), for the standard Aromax® II Catalyst in the bottom half of the fixed bed reactors shown in FIG. 2A ("Baseline") versus FIG. 2B ("Split Bed"), demonstrating better activity for the standard catalyst downstream of the high chloride catalyst, as compared to the standard catalyst downstream of more standard catalyst, that is, a catalyst having a standard concentration of chloride.
Figure 4:
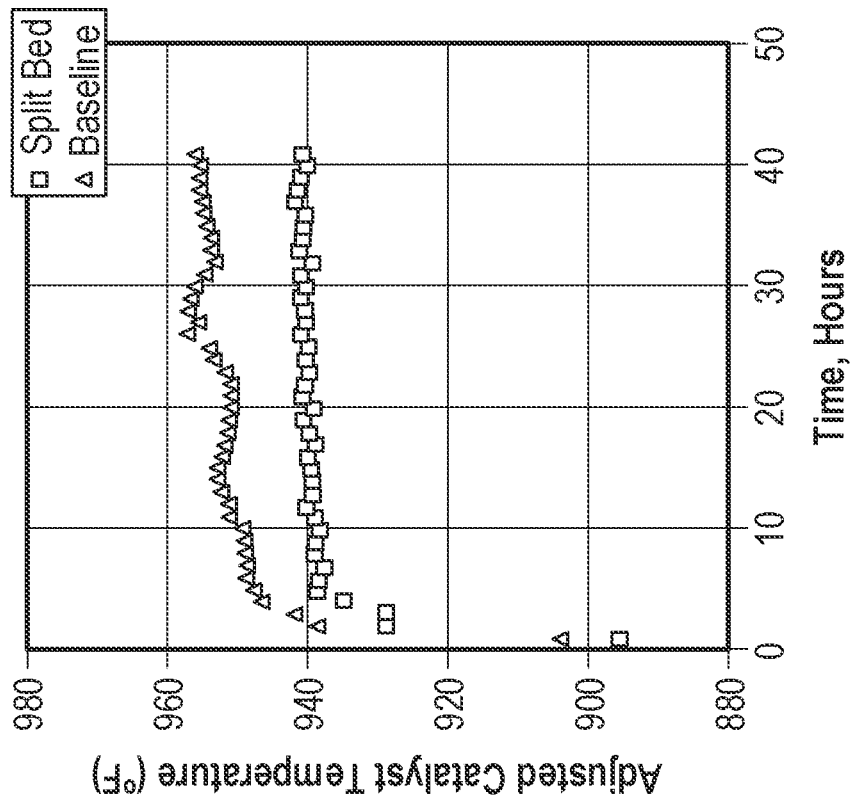
FIG. 4 illustrates a plot of the selectivity (mol/mol) versus run time (hours), for the standard Aromax® II Catalyst in the bottom half of the fixed bed reactors shown in FIG. 2A ("Baseline") versus FIG. 2B ("Split Bed"), demonstrating better selectivity for the standard catalyst downstream of the high chloride catalyst, as compared to the standard catalyst downstream of more standard catalyst, that is, a catalyst having a standard concentration of chloride.

Therefore, FIG. 3 illustrates a plot of the adjusted catalyst temperature (° F.) versus run time (hours), for the standard Aromax® II Catalyst in the bottom half of the fixed bed reactors shown in FIG. 2A ("Baseline") versus FIG. 2B ("Split Bed"), demonstrating better activity for the standard catalyst downstream of the high chloride catalyst, as compared to the standard catalyst downstream of more standard catalyst, that is, catalyst having a standard concentration of chloride. FIG. 4 illustrates a plot of the selectivity (mol/mol) versus run time (hours), for the standard Aromax® II Catalyst in the bottom half of the fixed bed reactors shown in FIG. 2A ("Baseline") versus FIG. 2B ("Split Bed"), demonstrating better selectivity for the standard catalyst downstream of the high chloride catalyst, as compared to the standard catalyst downstream of more standard catalyst, that is, catalyst having a standard concentration of chloride.

This same effect of the downstream catalyst has been observed on commercial scale aromatization reactors in series. Reactor number 3 (of six reactors in series) contained a high chloride catalyst while the remaining five reactors of the six total reactors had the standard Aromax® II Catalyst. The catalyst activity was compared in the various reactors. Both reactor number 4 and reactor number 5, downstream of the high chloride reactor number 3, showed an increase in activity from the expected levels observed when no high chloride reactor was used as the number 3 reactor. While not intending to be theory bound, this observation was attributed to the interaction of the catalysts in those downstream reactor number 4 and reactor number 5 with the evolved chloride from reactor number 3.

Accordingly, it is observed that upstream high halide reactors such as high chloride reactors can extend the run life of the reactors downstream of the high halide catalyst and increase the selectivity of the reactors downstream of the high halide catalyst.

The invention is described above with reference to numerous aspects, features, embodiments, and specific examples. Many variations will suggest themselves to those skilled in the art in light of the above detailed description. All such obvious variations are within the full intended scope of the appended claims. These and other aspects of the disclosure can further include, but are not limited to, the various embodiments that are presented below. Many aspects or embodiments are described as "comprising" certain components or steps, but alternatively, can "consist essentially of" or "consist of" those components or steps unless specifically stated otherwise.

Aspects of the Disclosure

Aspect 1. A process for reforming hydrocarbons comprising:
  a) in a first catalyst bed, contacting a feedstock containing aliphatic hydrocarbons with a first catalyst comprising an inorganic support, a Group 8-10 metal, and at least or about 1.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons;
  b) in one or more intermediate catalyst beds in series, contacting the first catalyst bed discharge with one or more independently selected intermediate catalysts, each comprising an inorganic support, a Group 8-10 metal, and fluoride, under conditions for aromatizing aliphatic hydrocarbons to form one or more intermediate catalyst bed discharges comprising aromatic hydrocarbons and aliphatic hydrocarbons; and c) in a last catalyst bed, contacting the one or more intermediate catalyst bed discharges with a last catalyst comprising an inorganic support, a Group 8-10 metal, and at least or about 0.7 wt % fluoride relative to the weight of the last catalyst prior to reduction, under conditions for aromatizing aliphatic hydrocarbons to form a last catalyst bed discharge comprising aromatic products;

wherein the fluoride concentration of the first catalyst or the fluoride concentration of at least one of the intermediate catalysts is greater than the fluoride concentration of the last catalyst prior to reduction.

Aspect 2. A process for reforming hydrocarbons comprising:
  a) in a first catalyst bed, contacting a feedstock containing aliphatic hydrocarbons with a first catalyst comprising an inorganic support, a Group 8-10 metal, and at least or about 1.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons; and
  b) in a last catalyst bed, contacting the first catalyst bed discharge with a last catalyst comprising an inorganic support, a Group 8-10 metal, and at least or about 0.7 wt % fluoride relative to the weight of the last catalyst prior to reduction, under conditions for aromatizing aliphatic hydrocarbons to form a last catalyst bed discharge comprising aromatic products;
  wherein the fluoride concentration of the first catalyst is greater than the fluoride concentration of the last catalyst prior to reduction.

Aspect 3. A process for reforming hydrocarbons comprising:
  a) in a first catalyst bed, contacting a feedstock containing aliphatic hydrocarbons with a first catalyst comprising an inorganic support, a Group 8-10 metal, and at least or about 1.5 wt % chloride relative to the weight of the first catalyst prior to reduction, under conditions for aromatizing aliphatic hydrocarbons to form a first catalyst bed discharge comprising aromatic hydrocarbons and aliphatic hydrocarbons;
  b) in one or more intermediate catalyst beds in series, contacting the first catalyst bed discharge with one or more independently selected intermediate catalysts, each comprising an inorganic support, a Group 8-10 metal, and chloride, under conditions for aromatizing aliphatic hydrocarbons to form one or more intermediate catalyst bed discharges comprising aromatic hydrocarbons and aliphatic hydrocarbons; and
  c) in a last catalyst bed, contacting the one or more intermediate catalyst bed discharges with a last catalyst comprising an inorganic support, a Group 8-10 metal, and at least or about 0.5 wt % chloride relative to the weight of the last catalyst prior to reduction, under conditions for aromatizing aliphatic hydrocarbons to form a last catalyst bed discharge comprising aromatic products;
  wherein the chloride concentration of the first catalyst or the chloride concentration of at least one of the intermediate catalysts is greater than the chloride concentration of the last catalyst prior to reduction.

Aspect 4. A process for reforming hydrocarbons comprising:
  a) in a first catalyst bed, contacting a feedstock containing aliphatic hydrocarbons with a first catalyst comprising an inorganic support, a Group 8-10 metal, and at least or about 1.5 wt % chloride relative to the weight of the first catalyst prior to reduction, under conditions for aromatizing aliphatic hydrocarbons to form a first catalyst bed discharge comprising aromatic hydrocarbons and aliphatic hydrocarbons; and
  b) in a last catalyst bed, contacting the first catalyst bed discharge with a last catalyst comprising an inorganic support, a Group 8-10 metal, and at least or about 0.5 wt % chloride relative to the weight of the last catalyst prior to reduction, under conditions for aromatizing aliphatic hydrocarbons to form a last catalyst bed discharge comprising aromatic products;
  wherein the chloride concentration of the first catalyst is greater than the chloride concentration of the last catalyst prior to reduction.

Aspect 5. A catalytic hydrocarbon reforming system comprising:
  at least three catalyst beds in series, including an upstream first catalyst bed, a downstream last catalyst bed, and one or more intermediate catalyst beds in series between the first catalyst bed and the last catalyst bed;
  a first catalyst in the first catalyst bed comprising an inorganic support, a Group 8-10 metal, and at least or about 1.0 wt % fluoride relative to the weight of the first catalyst prior to reduction;
  one or more independently selected intermediate catalysts in the one or more intermediate catalyst beds, each intermediate catalyst comprising an inorganic support, a Group 8-10 metal, and fluoride; and
  a last catalyst in the last catalyst bed comprising an inorganic support, a Group 8-10 metal, and at least or about 0.7 wt % fluoride relative to the weight of the last catalyst prior to reduction;
  wherein the fluoride concentration of the first catalyst or the fluoride concentration of at least one of the intermediate catalysts is greater than the fluoride concentration of the last catalyst prior to reduction.

Aspect 6. A catalytic hydrocarbon reforming system comprising:
  two catalyst beds in series, including an upstream first catalyst bed and a downstream last catalyst bed;
  a first catalyst in the first catalyst bed comprising an inorganic support, a Group 8-10 metal, and at least or about 1.0 wt % fluoride relative to the weight of the first catalyst prior to reduction; and
  a last catalyst in the last catalyst bed comprising an inorganic support, a Group 8-10 metal, and at least or about 0.7 wt % fluoride relative to the weight of the last catalyst prior to reduction;
  wherein the fluoride concentration of the first catalyst is greater than the fluoride concentration of the last catalyst prior to reduction.

Aspect 7. A catalytic hydrocarbon reforming system comprising:
  at least three catalyst beds in series, including an upstream first catalyst bed, a downstream last catalyst bed, and one or more intermediate catalyst beds in series between the first catalyst bed and the last catalyst bed;
  a first catalyst in the first catalyst bed comprising an inorganic support, a Group 8-10 metal, and at least or about 1.5 wt % chloride relative to the weight of the first catalyst prior to reduction;
  one or more independently selected intermediate catalysts in the one or more intermediate catalyst beds, each intermediate catalyst comprising an inorganic support, a Group 8-10 metal, and chloride; and a last catalyst in the last catalyst bed comprising an inorganic support, a Group 8-10 metal, and at least or about 0.5 wt % chloride relative to the weight of the last catalyst prior to reduction;

wherein the chloride concentration of the first catalyst or the chloride concentration of at least one of the intermediate catalysts is greater than the chloride concentration of the last catalyst prior to reduction.

Aspect 8. A catalytic hydrocarbon reforming system comprising:

two catalyst beds in series, including an upstream first catalyst bed and a downstream last catalyst bed;

a first catalyst in the first catalyst bed comprising an inorganic support, a Group 8-10 metal, and at least or about 1.5 wt % chloride relative to the weight of the first catalyst prior to reduction; and a last catalyst in the last catalyst bed comprising an inorganic support, a Group 8-10 metal, and at least or about 0.5 wt % chloride relative to the weight of the last catalyst prior to reduction;

wherein the chloride concentration of the first catalyst is greater than the chloride concentration of the last catalyst prior to reduction.

Aspect 9. A process for reforming hydrocarbons or a catalytic hydrocarbon reforming system according to any one of Aspects 1-2 or 5-6, wherein the first catalyst comprises up to about 5.0 wt %, up to about 4.0 wt %, up to about 3.5 wt %, up to about 3.0 wt %, or up to about 2.5 wt % fluoride relative to the weight of the first catalyst prior to reduction, and the last catalyst comprises up to about 4.0 wt %, up to about 3.0 wt %, up to about 2.5 wt %, up to about 2.0 wt %, or up to about 1.5 wt % fluoride relative to the weight of the last catalyst prior to reduction.

Aspect 10. A process for reforming hydrocarbons or a catalytic hydrocarbon reforming system according to any one of Aspects 3-4 or 7-8, wherein the first catalyst comprises up to about 5.0 wt %, up to about 4.0 wt %, up to about 3.5 wt %, up to about 3.0 wt %, or up to about 2.5 wt % chloride relative to the weight of the first catalyst prior to reduction, and the last catalyst comprises up to about 3.0 wt % up to about 2.5 wt %, up to about 2.0 wt %, or up to about 1.5 wt % chloride relative to the weight of the last catalyst prior to reduction.

Aspect 11. A process for reforming hydrocarbons or a catalytic hydrocarbon reforming system according to any one of Aspects 1-2, 5-6, or 9, wherein the first catalyst, any one or more of the intermediate catalysts, the last catalyst, or any combination thereof independently further comprises chloride.

Aspect 12. A process for reforming hydrocarbons or a catalytic hydrocarbon reforming system according to any one of Aspects 3-4, 7-8, or 10, wherein the first catalyst, any one or more of the intermediate catalysts, the last catalyst, or any combination thereof independently further comprises fluoride.

Aspect 13. A process for reforming hydrocarbons or a catalytic hydrocarbon reforming system according to any one of Aspects 1-2 or 5-6, wherein the first catalyst comprises fluoride in a concentration range of from about 1.0 wt % to about 4.0 wt %, from about 1.2 wt % to about 3.2 wt %, from about 1.5 wt % to about 2.8 wt %, from about 1.7 wt % to about 2.5 wt %, or from about 1.8 wt % to about 2.3 wt % relative to the weight of the first catalyst prior to reduction.

Aspect 14. A process for reforming hydrocarbons or a catalytic hydrocarbon reforming system according to any one of Aspects 1-2 or 5-6, wherein any one or more of the intermediate catalysts, the last catalyst, or any combination thereof independently comprises fluoride in a concentration range of from about 0.7 wt % to about 2.5 wt %, from about 0.8 wt % to about 2.3 wt %, from about 0.9 wt % to about 2.0 wt %, from about 1.0 wt % to about 2.0 wt %, or from about 1.2 wt % to about 1.8 wt % relative to the weight of the respective intermediate catalyst or last catalyst prior to reduction.

Aspect 15. A process for reforming hydrocarbons or a catalytic hydrocarbon reforming system according to any one of Aspects 11 or 13-14, wherein the first catalyst, any one or more of the intermediate catalysts, the last catalyst, or any combination thereof independently further comprises chloride in a concentration range of from about 1.5 wt % to about 4.0 wt %, from about 1.8 wt % to about 3.6 wt %, from about 2.2 wt % to about 3.4 wt %, or from about 2.0 wt % to about 3.3 wt % relative to the weight of the respective first catalyst, intermediate catalyst, or last catalyst prior to reduction.

Aspect 16. A process for reforming hydrocarbons or a catalytic hydrocarbon reforming system according to any one of Aspects 11 or 13-14, wherein the first catalyst, any one or more of the intermediate catalysts, the last catalyst, or any combination thereof independently further comprises chloride in a concentration range of from about 0.5 wt % to about 2.5 wt %, from about 0.6 wt % to about 2.3 wt %, from about 0.7 wt % to about 2.0 wt %, or from about 0.8 wt % to about 1.7 wt % relative to the weight of the respective first catalyst, intermediate catalyst, or last catalyst prior to reduction.

Aspect 17. A process for reforming hydrocarbons or a catalytic hydrocarbon reforming system according to any one of Aspects 11 or 13-16, wherein the chloride concentration of the first catalyst or the chloride concentration of at least one of the intermediate catalysts is greater than the chloride concentration of the last catalyst prior to reduction.

Aspect 18. A process for reforming hydrocarbons or a catalytic hydrocarbon reforming system according to any one of Aspects 3-4 or 7-8, wherein the first catalyst comprises chloride in a concentration range of from about 1.5 wt % to about 4.0 wt %, from about 1.8 wt % to about 3.6 wt %, from about 2.2 wt % to about 3.4 wt %, or from about 2.0 wt % to about 3.3 wt % relative to the weight of the first catalyst prior to reduction.

Aspect 19. A process for reforming hydrocarbons or a catalytic hydrocarbon reforming system according to any one of Aspects 3-4 or 7-8, wherein any one or more of the intermediate catalysts, the last catalyst, or any combination thereof independently comprises chloride in a concentration range of from about 0.5 wt % to about 2.5 wt %, from about 0.6 wt % to about 2.3 wt %, from about 0.7 wt % to about 2.0 wt %, or from about 0.8 wt % to about 1.7 wt % relative to the weight of the respective intermediate catalyst or last catalyst prior to reduction.

Aspect 20. A process for reforming hydrocarbons or a catalytic hydrocarbon reforming system according to any one of Aspects 12 or 18-19, wherein the first catalyst, any one or more of the intermediate catalysts, the last catalyst, or any combination thereof independently further comprises fluoride in a concentration range of from about 1.0 wt % to about 4.0 wt %, from about 1.2 wt % to about 3.2 wt %, from about 1.5 wt % to about 2.8 wt %, from about 1.7 wt % to about 2.5 wt %, or from about 1.8 wt % to about 2.3 wt % relative to the weight of the respective first catalyst, intermediate catalyst, or last catalyst prior to reduction.

Aspect 21. A process for reforming hydrocarbons or a catalytic hydrocarbon reforming system according to any one of Aspects 12 or 18-19, wherein the first catalyst, any one or more of the intermediate catalysts, the last catalyst, or any combination thereof independently further comprises fluoride in a concentration range of from about 0.7 wt % to about 2.5 wt %, from about 0.8 wt % to about 2.3 wt %, from about 0.9 wt % to about 2.0 wt %, from about 1.0 wt % to about 2.0 wt %, or from about 1.2 wt % to about 1.8 wt % relative to the weight of the respective first catalyst, intermediate catalyst, or last catalyst prior to reduction.

Aspect 22. A process for reforming hydrocarbons or a catalytic hydrocarbon reforming system according to any one of Aspects 12 or 18-21, wherein the fluoride concentration of the first catalyst or the fluoride concentration of at least one of the intermediate catalysts is greater than the fluoride concentration of the last catalyst prior to reduction.

Aspect 23. A process for reforming hydrocarbons or a catalytic hydrocarbon reforming system according to any one of Aspects 11-12, 15-17, or 20-22, wherein any one or more of the first catalyst, the intermediate catalysts, and/or the last catalyst independently comprise any weight ratio of chlorine to fluorine (Cl:F) disclosed herein, for example, from about 1.5:1 to about 8:1, from about 2:1 to about 5:1, or from about 3:1 to about 4.5:1.

Aspect 24. A process for reforming hydrocarbons or a catalytic hydrocarbon reforming system according to any one of Aspects 11-12, 15-17, or 20-22, wherein any one or more of the first catalyst, the intermediate catalysts, and/or the last catalyst independently comprise a weight ratio of chlorine to fluorine (Cl:F) of from about 1:10 to about 10:1, from about 1:5 to about 5:1, or from about 1:2 to about 2:1.

Aspect 25. A process for reforming hydrocarbons or a catalytic hydrocarbon reforming system according to any one of Aspects 1-2, 5-6, 9, 11-17, or 20-22, wherein the fluoride concentration of the first catalyst is from 10% to 50% greater than, from 25% to 65% greater than, or from 50% to 90% greater than the fluoride concentration of the last catalyst.

Aspect 26 A process for reforming hydrocarbons or a catalytic hydrocarbon reforming system according to any one of Aspects 3-4, 7-8, 10, 12, or 15-22, wherein the chloride concentration of the first catalyst is from 10% to 50% greater than, from 25% to 65% greater than, or from 50% to 90% greater than the chloride concentration of the last catalyst.

Aspect 27. A process for reforming hydrocarbons or a catalytic hydrocarbon reforming system according to Aspect 11, wherein the first catalyst further comprises from about 0.5 wt % to about 5 wt % chloride relative to the weight of the first catalyst prior to reduction, and wherein the last catalyst further comprises from about 0.5 wt % to about 5 wt % chloride relative to the weight of the last catalyst prior to reduction.

Aspect 28. A process for reforming hydrocarbons or a catalytic hydrocarbon reforming system according to Aspect 12, wherein the first catalyst further comprises from about 0.5 wt % to about 5 wt % fluoride relative to the weight of the first catalyst prior to reduction, and wherein the last catalyst further comprises from about 0.5 wt % to about 5 wt % fluoride relative to the weight of the last catalyst prior to reduction.

Aspect 29. A process for reforming hydrocarbons or a catalytic hydrocarbon reforming system according to any one of Aspects 11-28, wherein any one or more of the first catalyst, the intermediate catalysts, and/or the last catalyst comprise a combined concentration of fluoride and chloride of up to about 5 wt % relative to the weight of that catalyst prior to reduction.

Aspect 30. A process for reforming hydrocarbons or a catalytic hydrocarbon reforming system according to any one of Aspects 1, 5, 9, 11, 13-17, 23-25, 27, or 29, wherein the fluoride concentration (wt %) of each of the one or more independently selected intermediate catalysts at startup is greater than or equal to the fluoride concentration of the last catalyst prior to reduction.

Aspect 31. A process for reforming hydrocarbons or a catalytic hydrocarbon reforming system according to any one of Aspects 3, 7, 10, 12, 18-24, 26, or 28-29, wherein the chloride concentration (wt %) of each of the one or more independently selected intermediate catalysts at startup is greater than or equal to the chloride concentration of the last catalyst prior to reduction.

Aspect 32. A process for reforming hydrocarbons or a catalytic hydrocarbon reforming system according to any one of Aspects 1, 5, 9, 11, 13-17, 23-25, 27, or 29, wherein:
the fluoride concentration (wt %) of each of the one or more independently selected intermediate catalysts at startup is less than or equal to the fluoride concentration of the first catalyst prior to reduction and greater than or equal to the fluoride concentration of the last catalyst prior to reduction; or
the fluoride concentration (wt %) of each of the one or more independently selected intermediate catalysts at startup is greater than or equal to the fluoride concentration of the first catalyst prior to reduction and greater than or equal to the fluoride concentration of the last catalyst prior to reduction.

Aspect 33. A process for reforming hydrocarbons or a catalytic hydrocarbon reforming system according to any one of Aspects 3, 7, 10, 12, 18-24, 26, or 28-29, wherein:
the chloride concentration (wt %) of each of the one or more independently selected intermediate catalysts at startup is less than or equal to the chloride concentration of the first catalyst prior to reduction and greater than or equal to the chloride concentration of the last catalyst prior to reduction; or
the chloride concentration (wt %) of each of the one or more independently selected intermediate catalysts at startup is greater than or equal to the chloride concentration of the first catalyst prior to reduction and greater than or equal to the chloride concentration of the last catalyst prior to reduction Aspect 34. A process for reforming hydrocarbons or a catalytic hydrocarbon reforming system according to any one of Aspects 1-33, wherein the first catalyst bed, the one or more intermediate catalyst beds, and the last catalyst bed are each in different reactors.

Aspect 35. A process for reforming hydrocarbons or a catalytic hydrocarbon reforming system according to any one of Aspects 1-33, wherein two adjacent catalyst beds in the series are in a single reactor.

Aspect 36. A process for reforming hydrocarbons or a catalytic hydrocarbon reforming system according to any one of Aspects 1-33, wherein:
the process or system includes from 1 to 6 intermediate catalyst beds comprising from 1 to 6 intermediate catalysts, respectively; and
the first catalyst bed, the 1 to 6 intermediate catalyst beds, and the last catalyst bed are all in different reactors.

Aspect 37. A process for reforming hydrocarbons or a catalytic hydrocarbon reforming system according to any one of Aspects 1-33, wherein:
the process or system includes from 1 to 6 intermediate catalyst beds comprising from 1 to 6 intermediate catalysts, respectively, the first catalyst bed, the 1 to 6 intermediate catalyst beds, and the last catalyst bed are all in different reactors, and the fluoride concentration (wt %) of each of the 1 to 6 intermediate catalysts at startup is selected independently of the fluoride concentration of any other catalyst and is at least or about the same fluoride concentration of the last catalyst prior to reduction.

Aspect 38. A process for reforming hydrocarbons or a catalytic hydrocarbon reforming system according to any one of Aspects 1-33, wherein the process or system includes 4 or 5 intermediate catalyst beds, and wherein each of the first, the intermediate, and the last catalyst beds is in its own reactor.

Aspect 39. A process for reforming hydrocarbons or a catalytic hydrocarbon reforming system according to any one of Aspects 1-33, wherein:

the process or system includes 4 or 5 intermediate catalyst beds, each comprising its own respective intermediate catalyst;

the first catalyst bed, the 4 or 5 intermediate catalyst beds, and the last catalyst bed are each in different reactors; and the volume of each of the 4 or 5 intermediate reactors is greater than or equal to the volume of the first reactor and less than or equal to the volume of the last reactor.

Aspect 40. A process for reforming hydrocarbons or a catalytic hydrocarbon reforming system according to any one of Aspects 1-33, wherein:

the process or system includes 4 intermediate catalyst beds, each comprising its own respective intermediate catalyst;

the first catalyst bed, the 4 intermediate catalyst beds, and the last catalyst bed are all in different reactors; and the volume of each of the 4 intermediate reactors and the last reactor is greater than or equal to volume of the reactor immediately upstream that reactor.

Aspect 41. A process for reforming hydrocarbons or a catalytic hydrocarbon reforming system according to any one of Aspects 1-33, wherein:

the process or system includes 4 intermediate catalyst beds, each comprising its own respective intermediate catalyst;

the first catalyst bed, the 4 intermediate catalyst beds, and the last catalyst bed are all in different reactors; and the relative volumes of the first, 4 intermediate, and last reactors is 10:10:10:20:20:30.

Aspect 42. A process for reforming hydrocarbons according to any one of Aspects 1, 3, 5, 7, or 9-33, wherein the first catalyst bed discharge and/or the one or more intermediate catalyst bed discharges are heated prior to entering the subsequent catalyst bed.

Aspect 43. A catalytic hydrocarbon reforming system according to any one of Aspects 1, 3, 5, 7, or 9-33, further comprising at least one furnace upstream of the first catalyst bed and/or any one or more of the intermediate catalyst beds.

Aspect 44. A process for reforming hydrocarbons or a catalytic hydrocarbon reforming system according to any one of Aspects 1-43, wherein the inorganic support of the first catalyst, the one or more intermediate catalysts, and/or the last catalyst each comprises, independently, a crystalline or an amorphous inorganic oxide, or combinations thereof.

Aspect 45. A process for reforming hydrocarbons or a catalytic hydrocarbon reforming system according to any one of Aspects 1-43, wherein the inorganic support of the first catalyst, the one or more intermediate catalysts, and/or the last catalyst each comprises, independently, a zeolite, a silica-bound zeolite, a clay mineral, silica, alumina, silica-alumina, aluminum phosphate, a heteropolytungstate, titania, zirconia, magnesia, boria, zinc oxide, mixed oxides thereof, or mixtures thereof.

Aspect 46. A process for reforming hydrocarbons or a catalytic hydrocarbon reforming system according to any one of Aspects 1-43, wherein the inorganic support of the first catalyst, the one or more intermediate catalysts, and/or the last catalyst each comprises, independently, a zeolite.

Aspect 47. A process for reforming hydrocarbons or a catalytic hydrocarbon reforming system according to any one of Aspects 1-43, wherein the inorganic support of the first catalyst, the one or more intermediate catalysts, and/or the last catalyst each comprises, independently, L-zeolite, K/L-zeolite, X-zeolite, Y-zeolite, omega zeolite, beta zeolite, ZSM-4, ZSM-5, ZSM-10, ZSM-11, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, faujasite, or combinations thereof.

Aspect 48. A process for reforming hydrocarbons or a catalytic hydrocarbon reforming system according to any one of Aspects 1-43, wherein the inorganic support of the first catalyst, the one or more intermediate catalysts, and/or the last catalyst each comprises, independently, L-zeolite, K/L-zeolite, X-zeolite, mordenite, mazzite, or ZSM-5.

Aspect 49. A process for reforming hydrocarbons or a catalytic hydrocarbon reforming system according to any one of Aspects 44-48, wherein the inorganic support of the first catalyst, the one or more intermediate catalysts, and/or the last catalyst each further comprises, independently, a binder.

Aspect 50. A process for reforming hydrocarbons or a catalytic hydrocarbon reforming system according to Aspect 49, wherein the inorganic support of the first catalyst, the one or more intermediate catalysts, and/or the last catalyst each comprises, independently, any weight percentage of binder disclosed herein, for example, from about 3 wt % to about 35 wt %, or from about 5 wt % to about 30 wt % binder, based on the total weight of the first catalyst, the intermediate catalysts, and the last catalyst.

Aspect 51. A process for reforming hydrocarbons or a catalytic hydrocarbon reforming system according to any one of Aspects 49-50, wherein the binder of each inorganic support independently comprises an inorganic solid oxide, a clay, or a combination thereof.

Aspect 52. A process for reforming hydrocarbons or a catalytic hydrocarbon reforming system according to any one of Aspects 49-50, wherein the binder of each inorganic support independently comprises alumina, silica, magnesia, boria, titania, zirconia, a mixed oxide thereof, or a mixture thereof.

Aspect 53. A process for reforming hydrocarbons or a catalytic hydrocarbon reforming system according to any one of Aspects 49-50, wherein each inorganic support independently comprises a silica-bound or alumina-bound L-zeolite, barium ion-exchanged L-zeolite, or K/L-zeolite.

Aspect 54. A process for reforming hydrocarbons or a catalytic hydrocarbon reforming system according to Aspect 53, wherein each inorganic support is independently produced by a process comprising:

a) combining the L-zeolite, barium ion-exchanged L-zeolite, or K/L-zeolite with a silica or alumina sol to form a mixture, extruding the mixture to form an extrudate, b) drying, and calcining the extrudate to form a bound support; and c) washing, drying, and calcining the bound support to form the inorganic support.

Aspect 55. A process for reforming hydrocarbons or a catalytic hydrocarbon reforming system according to any one of Aspects 1-43, wherein the inorganic support of the first catalyst, the one or more intermediate catalysts, and/or the last catalyst each comprises, independently, zeolite and a binder.

Aspect 56. A process for reforming hydrocarbons or a catalytic hydrocarbon reforming system according to any one of Aspects 1-43, wherein the Group 8-10 metal of the first catalyst, the one or more intermediate catalysts, and/or the last catalyst is selected independently from iron, cobalt, nickel, ruthenium, rhodium, palladium, osmium, iridium, platinum, or any combination thereof.

Aspect 57. A process for reforming hydrocarbons or a catalytic hydrocarbon reforming system according to any one of Aspects 1-43, wherein the first catalyst, the one or more intermediate catalysts, and/or the last catalyst each comprises, independently, a Group 8 metal selected independently from iron, ruthenium, or osmium.

Aspect 58. A process for reforming hydrocarbons or a catalytic hydrocarbon reforming system according to any one of Aspects 1-43, wherein the first catalyst, the one or more intermediate catalysts, and/or the last catalyst each comprises, independently, a Group 9 metal selected independently from cobalt, rhodium, or iridium.

Aspect 59. A process for reforming hydrocarbons or a catalytic hydrocarbon reforming system according to any one of Aspects 1-43, wherein the first catalyst, the one or more intermediate catalysts, and/or the last catalyst each comprises, independently, a Group 10 metal selected independently from nickel, palladium, or platinum.

Aspect 60. A process for reforming hydrocarbons or a catalytic hydrocarbon reforming system according to any one of Aspects 1-43, wherein the first catalyst, the one or more intermediate catalysts, and/or the last catalyst each comprises, independently, platinum and L-zeolite.

Aspect 61. A process for reforming hydrocarbons or a catalytic hydrocarbon reforming system according to any one of Aspects 1-43, wherein the first catalyst, the one or more intermediate catalysts, and/or the last catalyst each comprises, independently, any weight percentage of transition metal disclosed herein, for example, from about 0.5 wt % to about 2.5 wt %, from about 0.5 wt % to about 2 wt %, or from about 0.7 wt % to about 1.5 wt % transition metal.

Aspect 62. A process for reforming hydrocarbons or a catalytic hydrocarbon reforming system according to any one of Aspects 1-43, wherein the Group 8-10 metal of each of the first catalyst, the one or more intermediate catalysts, and/or the last catalyst is platinum and the platinum concentration of each catalyst is selected independently from about 0.3 wt % to about 1.5 wt % relative to the weight of each respective catalyst prior to reduction.

Aspect 63. A process for reforming hydrocarbons according to any one of Aspects 1-4 and 9-62, wherein the conditions for aromatizing aliphatic hydrocarbons comprise catalyst startup at a gas flow rate comprising a GHSV of between 400 and 2000 hr$^{-1}$ and a heat-up rate of between 5° F./hr and 50° F./hr during catalyst reduction above about 500° F., wherein the first catalyst, the intermediate catalysts, and/or the last catalyst comprise a fluorided zeolite catalyst containing a Group 8-10 metal.

Aspect 64. A process for reforming hydrocarbons according to any one of Aspects 1-4 and 9-62, wherein the conditions for aromatizing aliphatic hydrocarbons comprise catalyst startup at a gas flow rate comprising a GHSV of between 600 and 1500 hr$^{-1}$ and a heat-up rate of between 10° F./hr and 30° F./hr during catalyst reduction above about 500° F., wherein the first catalyst, the intermediate catalysts, and/or the last catalyst comprise a fluorided zeolite platinum catalyst.

Aspect 65. A process for reforming hydrocarbons according to any one of Aspects 1-4 and 9-62, wherein the conditions for aromatizing aliphatic hydrocarbons comprise catalyst startup at a gas flow rate comprising a GHSV of between 600 and 1500 hr$^{-1}$ and a heat-up rate of between 10° F./hr and 25° F./hr during catalyst reduction above about 500° F., wherein the first catalyst, the intermediate catalysts, and/or the last catalyst comprise a fluorided-chlorided zeolite platinum catalyst.

Aspect 66. A process for reforming hydrocarbons according to any one of Aspects 1-4 and 9-62, wherein the first catalyst bed, the intermediate catalyst beds, and the last catalyst bed are in a radial flow reactor.

Aspect 67. A process for reforming hydrocarbons or a catalytic hydrocarbon reforming system according to any one of Aspects 1-4 and 9-62, wherein the first catalyst is characterized by a peak temperature on a Temperature Programmed Reduction (TPR) curve in any range disclosed herein, for example, about 580° F. to about 800° F., from about 580° F. to about 750° F., from about 600° F. to about 730° F., or from about 600° F. to about 720° F.

Aspect 68. A process for reforming hydrocarbons or a catalytic hydrocarbon reforming system according to any one of Aspects 1-4 and 9-62, wherein the first catalyst is characterized by a peak temperature on a Temperature Programmed Reduction (TPR) curve comprising a lower temperature peak and a higher temperature peak, and wherein the higher temperature peak is greater in height than the lower temperature peak.

Aspect 69. A process for reforming hydrocarbons or a catalytic hydrocarbon reforming system according to any one of Aspects 1-2, 5-6, or 9-62, wherein the first catalyst is characterized by a Temperature Programmed Reduction (TPR) curve that is from about 120° F. to about 300° F. greater than that of a catalyst having from 0.3 wt % to 1.0 wt % fluorine, under the same catalyst preparation conditions.

Aspect 70. A process for reforming hydrocarbons or a catalytic hydrocarbon reforming system according to any one of Aspects 3-4, 7-8, or 9-62, wherein the first catalyst is characterized by a Temperature Programmed Reduction (TPR) curve that is from about 120° F. to about 300° F. greater than that of a catalyst having from 0.3 wt % to 1.5 wt % chlorine, under the same catalyst preparation conditions.

We claim:
1. A process for reforming hydrocarbons comprising:
a) in a first catalyst bed, contacting a feedstock containing aliphatic hydrocarbons with a first catalyst comprising an inorganic support, a Group 8-10 metal, and from about 1.0 wt % to about 5.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons;
b) in one or more intermediate catalyst beds in series, contacting the first catalyst bed discharge with one or more independently selected intermediate catalysts, each comprising an inorganic support, a Group 8-10 metal, and fluoride, under conditions for aromatizing aliphatic hydrocarbons to form one or more intermediate catalyst bed discharges comprising aromatic hydrocarbons and aliphatic hydrocarbons; and c) in a last catalyst bed, contacting the one or more intermediate catalyst bed discharges with a last catalyst comprising an inorganic support, a Group 8-10 metal, and from about 0.7 wt % to about 4.0 wt % fluoride relative to the weight of the last catalyst prior to reduction, under conditions for aromatizing aliphatic hydrocarbons to form a last catalyst bed discharge comprising aromatic products;

wherein the fluoride concentration of the first catalyst or the fluoride concentration of at least one of the intermediate catalysts is greater than the fluoride concentration of the last catalyst prior to reduction.

2. A process for reforming hydrocarbons according to claim 1, wherein:
the first catalyst, any one or more of the intermediate catalysts, the last catalyst, or any combination thereof independently further comprises from about 1.5 wt % to about 4.0 wt % chloride relative to the weight of the respective first catalyst, intermediate catalyst, or last catalyst prior to reduction; and
the chloride concentration of the first catalyst or the chloride concentration of at least one of the intermediate catalysts is greater than the chloride concentration of the last catalyst prior to reduction.

3. A process for reforming hydrocarbons according to claim 2, wherein the chloride concentration (wt %) in the one or more intermediate catalysts at startup is greater than, less than, or equal to the chloride concentration of the first catalyst prior to reduction and greater than or equal to the chloride concentration of the last catalyst prior to reduction.

4. A process for reforming hydrocarbons according to claim 1, wherein the first catalyst bed, the one or more intermediate catalyst beds, and the last catalyst bed are each in different reactors.

5. A process for reforming hydrocarbons according to claim 1, wherein:
the process includes from 1 to 6 intermediate catalyst beds comprising from 1 to 6 intermediate catalysts, respectively,
the first catalyst bed, the 1 to 6 intermediate catalyst beds, and the last catalyst bed are all in different reactors, and
the fluoride concentration (wt %) in each of the 1 to 6 intermediate catalysts at startup is selected independently of the fluoride concentration in any other catalyst and is at least or about the same fluoride concentration of the last catalyst prior to reduction.

6. A process for reforming hydrocarbons according to claim 1, wherein:
the process includes 4 or 5 intermediate catalyst beds, each comprising its own respective intermediate catalyst;
the first catalyst bed, the 4 or 5 intermediate catalyst beds, and the last catalyst bed are each in different reactors; and
the volume of each of the 4 or 5 intermediate reactors is greater than or equal to the volume of the first reactor and less than or equal to the volume of the last reactor.

7. A process for reforming hydrocarbons according to claim 1, wherein the first catalyst bed discharge and/or the one or more intermediate catalyst bed discharges are heated prior to entering the subsequent catalyst bed.

8. A process for reforming hydrocarbons according to claim 1, wherein the first catalyst, the one or more intermediate catalysts, and the last catalyst each comprise, independently, an inorganic support comprising a zeolite, a silica-bound zeolite, a clay mineral, silica, alumina, silica-alumina, aluminum phosphate, a heteropolytungstate, titania, zirconia, magnesia, boria, zinc oxide, mixed oxides thereof, or mixtures thereof.

9. A process for reforming hydrocarbons according to claim 1, wherein the first catalyst, the one or more intermediate catalysts, and the last catalyst each comprise, independently, an inorganic support comprising L-zeolite, X-zeolite, Y-zeolite, omega zeolite, beta zeolite, ZSM-4, ZSM-5, ZSM-10, ZSM-11, ZSM-12, ZSM-20, REY, USY, RE-USY, LZ-210, LZ-210-A, LZ-210-M, LZ-210-T, SSZ-24, SSZ-26, SSZ-31, SSZ-33, SSZ-35, SSZ-37, SSZ-41, SSZ-42, SSZ-44, MCM-58, mordenite, mazzite, 3aujasite, or combinations thereof.

10. A process for reforming hydrocarbons according to claim 1, wherein the first catalyst, the one or more intermediate catalysts, and the last catalyst each comprise a Group 10 metal selected independently from nickel, palladium, or platinum.

11. A process for reforming hydrocarbons according to claim 1, wherein the first catalyst, the one or more intermediate catalysts, and/or the last catalyst comprise platinum and L-zeolite.

12. A process for reforming hydrocarbons according to claim 1, wherein the fluoride concentration (wt %) in the one or more intermediate catalysts at startup is greater than, less than, or equal to the fluoride concentration of the first catalyst prior to reduction and greater than or equal to the fluoride concentration of the last catalyst prior to reduction.

13. A process for reforming hydrocarbons according to claim 1, wherein any one or more of the first catalyst, the intermediate catalysts, and/or the last catalyst further comprise chloride and the weight ratio of chloride to fluoride is from 1:10 to 10:1.

14. A process for reforming hydrocarbons according to claim 1, wherein the Group 8-10 metal of each of the first catalyst, the one or more intermediate catalysts, and the last catalyst is platinum and the platinum concentration in each catalyst is selected independently from 0.3 wt % to 1.5 wt % relative to the weight of each respective catalyst prior to reduction.

15. A catalytic hydrocarbon reforming system comprising:
at least three catalyst beds in series, including an upstream first catalyst bed, a downstream last catalyst bed, and one or more intermediate catalyst beds in series between the first catalyst bed and the last catalyst bed;
a first catalyst in the first catalyst bed comprising an inorganic support, a Group 8-10 metal, and from about 1.0 wt % to about 5.0 wt % fluoride relative to the weight of the first catalyst prior to reduction;
one or more independently selected intermediate catalysts in the one or more intermediate catalyst beds, each intermediate catalyst comprising an inorganic support, a Group 8-10 metal, and fluoride; and
a last catalyst in the last catalyst bed comprising an inorganic support, a Group 8-10 metal, and from about 0.7 wt % to about 4.0 wt % fluoride relative to the weight of the last catalyst prior to reduction;
wherein the fluoride concentration of the first catalyst or the fluoride concentration of at least one of the intermediate catalysts is greater than the fluoride concentration of the last catalyst prior to reduction.

16. A catalytic hydrocarbon reforming system according to claim 15, wherein:
the first catalyst, any one or more of the intermediate catalysts, the last catalyst, or any combination thereof independently further comprises from about 1.5 wt % to about 4.0 wt % chloride relative to the weight of the respective first catalyst, intermediate catalyst, or last catalyst prior to reduction; and the chloride concentration of the first catalyst or the chloride concentration of at least one of the intermediate catalysts is greater than the chloride concentration of the last catalyst prior to reduction.

17. A catalytic hydrocarbon reforming system according to claim 15, wherein the chloride concentration (wt %) in the one or more intermediate catalysts at startup is greater than, less than, or equal to the chloride concentration of the first catalyst prior to reduction and greater than or equal to the chloride concentration of the last catalyst prior to reduction.

18. A catalytic hydrocarbon reforming system according to claim 15, wherein the first catalyst bed, the one or more intermediate catalyst beds, and the last catalyst bed are each in different reactors.

19. A catalytic hydrocarbon reforming system according to claim 15, wherein
the system includes from 1 to 6 intermediate catalyst beds comprising from 1 to 6 intermediate catalysts, respectively,
the first catalyst bed, the 1 to 6 intermediate catalyst beds, and the last catalyst bed are all in different reactors, and
the fluoride concentration (wt %) in each of the 1 to 6 intermediate catalysts at startup is selected independently of the fluoride concentration in any other catalyst and is at least or about the same fluoride concentration of the last catalyst prior to reduction.

20. A catalytic hydrocarbon reforming system according to claim 15, wherein the first catalyst, the intermediate catalysts, and the last catalyst each comprise, independently, an inorganic support comprising a zeolite, a silica-bound zeolite, a clay mineral, silica, alumina, silica-alumina, aluminum phosphate, a heteropolytungstate, titania, zirconia, magnesia, boria, zinc oxide, mixed oxides thereof, or mixtures thereof.

21. A catalytic hydrocarbon reforming system according to claim 15, wherein the first catalyst, the intermediate catalysts, and the last catalyst each comprise a Group 10 metal selected independently from nickel, palladium, or platinum.

22. A catalytic hydrocarbon reforming system according to claim 15, wherein the first catalyst, the intermediate catalysts, and/or the last catalyst comprise platinum and L-zeolite.

23. A catalytic hydrocarbon reforming system according to claim 15, wherein the fluoride concentration (wt %) in one or more intermediate catalysts at startup is greater than, less than, or equal to the fluoride concentration of the first catalyst prior to reduction and greater than or equal to the fluoride concentration of the last catalyst prior to reduction.

24. A catalytic hydrocarbon reforming system according to claim 15, wherein any one or more of the first catalyst, the intermediate catalysts, and/or the last catalyst further comprise chloride and the weight ratio of chloride to fluoride is from 1:10 to 10:1.

25. A process for reforming hydrocarbons comprising:
a) in a first catalyst bed, contacting a feedstock containing aliphatic hydrocarbons with a first catalyst comprising an inorganic support, a Group 8-10 metal, and at least or about 1.0 wt % fluoride relative to the weight of the first catalyst prior to reduction, under conditions for aromatizing aliphatic hydrocarbons to form a first catalyst bed discharge comprising aromatic hydrocarbons and aliphatic hydrocarbons; and
b) in a last catalyst bed, contacting the first catalyst bed discharge with a last catalyst comprising an inorganic support, a Group 8-10 metal, and at least or about 0.7 wt % fluoride relative to the weight of the last catalyst prior to reduction, under conditions for aromatizing aliphatic hydrocarbons to form a last catalyst bed discharge comprising aromatic products;
wherein the fluoride concentration of the first catalyst is greater than the fluoride concentration of the last catalyst prior to reduction.

26. A process for reforming hydrocarbons according to claim 25, wherein:
the first catalyst and the last catalyst independently further comprise from about 1.5 wt % to about 4.0 wt % chloride relative to the weight of the respective first catalyst and last catalyst prior to reduction; and
the chloride concentration of the first catalyst is greater than the chloride concentration of the last catalyst prior to reduction.

27. A catalytic hydrocarbon reforming system comprising:
two catalyst beds in series, including an upstream first catalyst bed and a downstream last catalyst bed;
a first catalyst in the first catalyst bed comprising an inorganic support, a Group 8-10 metal, and at least or about 1.0 wt % fluoride relative to the weight of the first catalyst prior to reduction; and
a last catalyst in the last catalyst bed comprising an inorganic support, a Group 8-10 metal, and at least or about 0.7 wt % fluoride relative to the weight of the last catalyst prior to reduction;
wherein the fluoride concentration of the first catalyst is greater than the fluoride concentration of the last catalyst prior to reduction.

28. A catalytic hydrocarbon reforming system according to claim 27, wherein:
the first catalyst and the last catalyst independently further comprise from about 1.5 wt % to about 4.0 wt % chloride relative to the weight of the respective first catalyst and last catalyst prior to reduction; and
the chloride concentration of the first catalyst is greater than the chloride concentration of the last catalyst prior to reduction.

* * * * *

UNITED STATES PATENT AND TRADEMARK OFFICE
CERTIFICATE OF CORRECTION

PATENT NO. : 12,286,595 B2
APPLICATION NO. : 18/322132
DATED : April 29, 2025
INVENTOR(S) : Cori A. Demmelmaier-Chang et al.

Page 1 of 1

It is certified that error appears in the above-identified patent and that said Letters Patent is hereby corrected as shown below:

In the Claims

In Claim 9, at Column 48, Line 12, please change "3aujasite" to read --faujasite--

Signed and Sealed this
Eighth Day of July, 2025

Coke Morgan Stewart
*Acting Director of the United States Patent and Trademark Office*